(12) United States Patent
Ha et al.

(10) Patent No.: US 10,866,906 B2
(45) Date of Patent: Dec. 15, 2020

(54) ADDRESS MAPPING METHOD AND OPERATION METHOD OF STORAGE DEVICE

(71) Applicant: Samsung Electronics Co., Ltd., Suwon-si (KR)

(72) Inventors: Keonsoo Ha, Seoul (KR); Minseok Ko, Seoul (KR); Hyunjoo Maeng, Goyang-si (KR); Jihyung Park, Yongin-si (KR)

(73) Assignee: Samsung Electronic Co., Ltd.

(*) Notice: Subject to any disclaimer, the term of this patent is extended or adjusted under 35 U.S.C. 154(b) by 154 days.

(21) Appl. No.: 15/933,435

(22) Filed: Mar. 23, 2018

(65) Prior Publication Data

US 2019/0057041 A1    Feb. 21, 2019

(30) Foreign Application Priority Data

Aug. 17, 2017  (KR) .......................... 10-2017-0104262

(51) Int. Cl.
*G06F 11/20* (2006.01)
*G06F 12/1018* (2016.01)
*G06F 12/02* (2006.01)

(52) U.S. Cl.
CPC ...... *G06F 12/1018* (2013.01); *G06F 11/2094* (2013.01); *G06F 12/0246* (2013.01); *G06F 2201/82* (2013.01); *G06F 2212/1024* (2013.01); *G06F 2212/1032* (2013.01); *G06F 2212/2022* (2013.01); *G06F 2212/657* (2013.01); *G06F 2212/7201* (2013.01); *G06F 2212/7203* (2013.01); *G06F 2212/7205* (2013.01); *G06F 2212/7208* (2013.01)

(58) Field of Classification Search
CPC .......................... G06F 11/1068; G06F 11/2094
USPC ........................................................ 714/6.13
See application file for complete search history.

(56) References Cited

U.S. PATENT DOCUMENTS

| 7,509,473 B2 * | 3/2009 | Horn .................... G06F 3/0607 711/206 |
| 8,094,560 B2 | 1/2012 | Bagepalli et al. |
| 9,158,681 B1 | 10/2015 | Samuels et al. |

(Continued)

OTHER PUBLICATIONS

J. Kim, Y.A. Winata and I Shin, "Multi-Thread Flash Translation Layer for Multi-Core Solid State Drives," International Journal of Applied Engineering Research ISSN 0973-4562, 2016.

(Continued)

*Primary Examiner* — Chae M Ko
(74) *Attorney, Agent, or Firm* — Myers Bigel, P.A.

(57) ABSTRACT

An address mapping method of a storage device which includes a plurality of sub-storage devices each including an over-provision area includes detecting mapping information of a received logical address from a mapping table, selecting a hash function corresponding to the received logical address depending on the mapping information, selecting any one, which is to be mapped onto the received logical address, of the plurality of sub-storage devices by using the selected hash function, and mapping the received logical address onto the over-provision area of the selected sub-storage device. The selected hash function is selected from a default hash function and a plurality of hash functions to provide a rule for selecting the any one of the plurality of sub-storage devices.

20 Claims, 19 Drawing Sheets

(56) References Cited

U.S. PATENT DOCUMENTS

| | | | |
|---|---|---|---|
| 9,378,135 B2 | 6/2016 | Bennett | |
| 9,612,955 B2 | 4/2017 | Akella et al. | |
| 2007/0109881 A1* | 5/2007 | Kuhne | G06F 12/0246 365/200 |
| 2008/0162793 A1* | 7/2008 | Chu | G06F 12/0246 711/103 |
| 2011/0161727 A1* | 6/2011 | Lee | G06F 11/1662 714/6.12 |
| 2012/0260138 A1* | 10/2012 | Downing, III | G11C 29/52 714/723 |
| 2013/0275655 A1* | 10/2013 | Chang | G06F 12/0246 711/103 |
| 2013/0275656 A1* | 10/2013 | Talagala | G06F 3/0679 711/103 |
| 2014/0059279 A1 | 2/2014 | He et al. | |
| 2015/0286529 A1* | 10/2015 | Lunde | G06F 11/1048 714/764 |
| 2016/0132396 A1 | 5/2016 | Kimmel et al. | |
| 2017/0046073 A1* | 2/2017 | Guo | G06F 3/0608 |
| 2017/0315891 A1* | 11/2017 | Park | G11C 29/883 |
| 2018/0293174 A1* | 10/2018 | Song | G06F 12/1009 |
| 2018/0341554 A1* | 11/2018 | Emami | G06F 11/3055 |

OTHER PUBLICATIONS

Biplob Debnath, Dudipta Sengupta, Jin Li; "ChunkStash: Speeding Up Inline Storage Deduplication Using Flash Memory," Academia. edu, www.academia.edu/8781360/ChunkStash_Speeding, Jun. 2010.

* cited by examiner

FIG. 7A

| LBA | Hash ID (SS numb.) | FiP |
|---|---|---|
| 0 | H0 | 0 |
| 1 | H0 | 0 |
| 2 | H0 | 0 |
| 3 | H0 | 0 |
| ⋮ | ⋮ | ⋮ |
| 360 | H0 | 1 |
| 361 | H0 | 0 |
| 362 | H0 | 0 |
| 363 | H0 | 0 |
| 364 | H1 | 1 |
| 365 | H0 | 0 |
| 366 | H0 | 0 |
| 367 | H0 | 0 |
| 368 | H2 | 1 |
| 369 | H0 | 0 |
| 370 | H0 | 0 |
| 371 | H0 | 0 |
| 372 | H3 | 1 |
| 373 | H0 | 0 |
| ⋮ | ⋮ | ⋮ |
| 399 | H0 | 0 |

FIG. 7B

Hash Pool

| Hash ID | f(LBA) |
|---|---|
| H0 | LBA%4 |
| H1 | LBA%4+1 |
| H2 | LBA%4+2 |
| H3 | LBA%4+3 |

ADDRESS MAPPING METHOD AND OPERATION METHOD OF STORAGE DEVICE

CROSS-REFERENCE TO RELATED APPLICATION

A claim for priority under 35 U.S.C. § 119 is made to Korean Patent Application No. 10-2017-0104262 filed on Aug. 17, 2017, in the Korean Intellectual Property Office, the entire contents of which are hereby incorporated by reference.

BACKGROUND

Embodiments of the inventive concepts disclosed herein relate to a semiconductor memory device, and more particularly, relate to an address mapping method and an operation method of a storage device including a plurality of sub-storage.

A flash memory device is an example of a nonvolatile memory device. The flash memory device has advantages of low power consumption, high integration, small size, and light weight. Nowadays, as the use of portable information devices such as a smartphone, a tablet PC, and a digital camera increases suddenly, the flash memory device is being widely used as a data storage device.

A solid state drive (hereinafter referred to as "SSD") is an example of a flash memory-based high-capacity storage device. The use of the SSD diversifies together with an explosive increase in a demand on the high-capacity storage device. For example, SSDs may be used for server, client, and data center.

Most high-capacity SSDs are equipped with a lot of flash memory devices. Some flash memory devices may be exposed to a progressive fail due to various causes. In this case, data stored in a fail flash memory device may be repaired by various repair algorithms. A logical address allocated to the fail flash memory device may be remapped onto a normal flash memory device through adjustment of an address mapping table. The remapping may enable the SSD to operate normally even though a fail is present in some flash memory devices.

A structure in which one SSD includes a plurality of sub-storage devices has been proposed for a demand on a high capacity and efficiency of address mapping corresponding to the demand. A structure of a sub-storage device is similar to that of the SSD. However, in the case where the SSD includes a plurality of sub-storage devices, simple address mapping may not be effective to address fails of the flash memory device due to performance degradation. Therefore, an address management technology which is effectively reduce performance degradation while addressing the fail flash memory device is disclosed.

SUMMARY

Embodiments of the inventive concepts provide an address mapping method and an operation method of a storage device capable of efficiently distributing logical addresses of the storage device including a plurality of sub-storage devices.

According to an aspect of an embodiment, an address mapping method of a storage device which includes a plurality of sub-storage devices is disclosed. Each of the plurality of sub-storage devices may include an over-provision area. The method may include detecting mapping information of a received logical address from a mapping table, selecting a hash function corresponding to the received logical address depending on the mapping information, selecting any one, which is to be mapped onto the received logical address, of the plurality of sub-storage devices by using the selected hash function, and mapping the received logical address onto the over-provision area of the selected sub-storage device. The selected hash function is selected from a default hash function and a plurality of hash functions to provide a rule for selecting the any one of the plurality of sub-storage devices.

According to another aspect of an embodiment, an operation method of a storage device which includes a plurality of sub-storage devices respectively including over-provision areas includes detecting whether to need to redistribute an available capacity in at least one of the plurality of sub-storage devices, notifying a host of a logical address mapped onto a fail area as a defective logical address and a logical address mapped onto a second memory area for replacing a first memory area mapped onto the defective logical address as a reallocated logical address, depending on the detection result, and writing data of the first memory area rebuilt by the host in the second memory area and distributing and storing data present in the second memory area to and in the over-provision areas of the plurality of sub-storage devices.

According to another aspect of an embodiment, an operation method of a storage device which includes a plurality of sub-storage devices respectively including over-provision areas includes detecting whether a fail memory area is present in at least one of the plurality of sub-storage devices, notifying a host of a first logical address corresponding to the fail memory area and a second logical address corresponding to a reallocated logical address for replacing the fail memory area as a defective logical address respectively, depending on the detection result, and storing data of a rebuilt fail memory area and a rebuilt reallocated memory area in the plurality of sub-storage devices. A part of the data of the rebuilt fail memory area and the rebuilt reallocated memory area are distributed to and stored in the over-provision areas of the plurality of sub-storage devices.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIGS. 7A and 7B are views illustrating mapping tables according to an embodiment of the inventive concepts;

DETAILED DESCRIPTION

Figure 1:
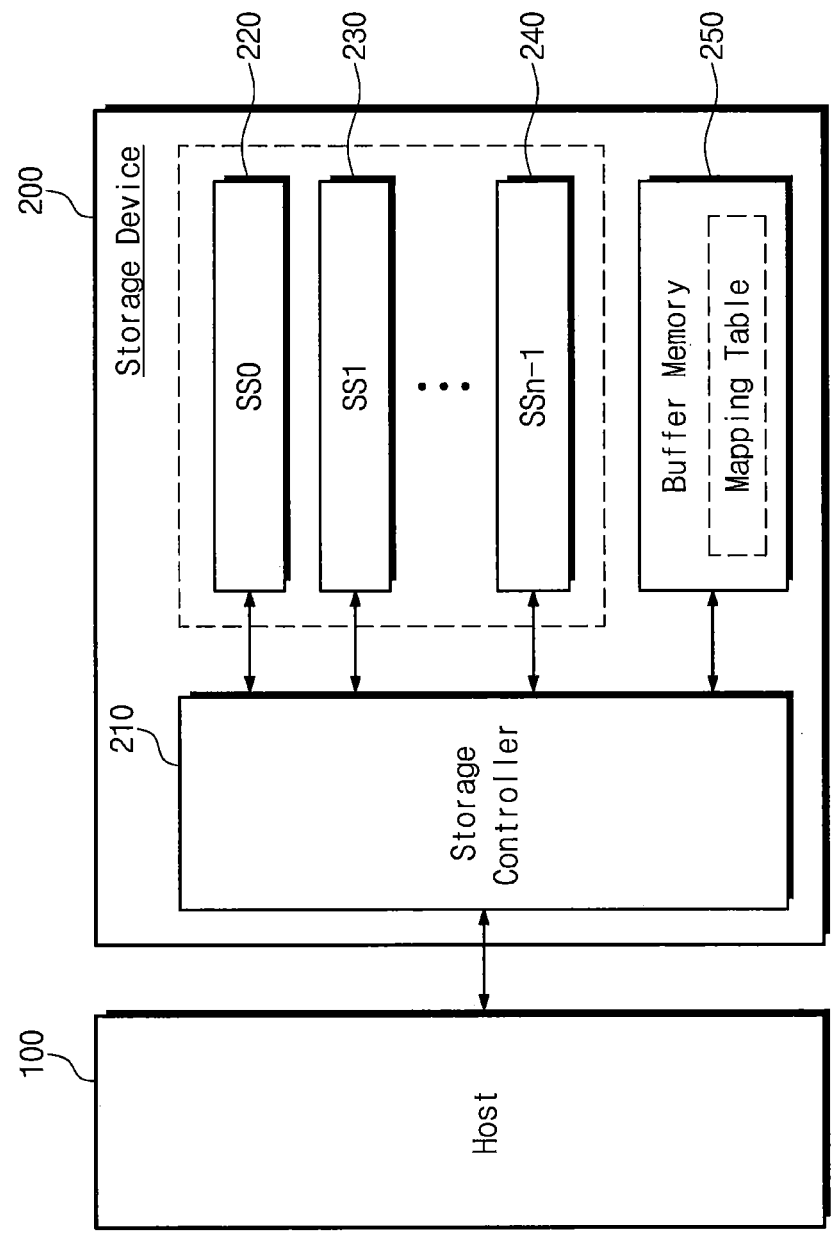
FIG. 1 is a block diagram illustrating a user device according to an embodiment of the inventive concepts.

It is to be understood that both the foregoing general description and the following detailed description are provided as examples, for illustration and not for limiting the scope of the present disclosure. Reference numerals will be represented in detail in embodiments of the inventive concepts, examples of which are illustrated in the accompanying drawings. Wherever possible, the same reference numerals are used in the drawings and the description to refer to the same or similar parts.

Below, as an example of a storage device, a solid state drive using a flash memory device will be exemplified to describe features and functions of the inventive concepts. However, one skilled in the art may easily understand other merits and performance of the inventive concepts depending on the contents disclosed here. The inventive concepts may be implemented or applied through other embodiments. In addition, the detailed description may be changed or modified according to view points and applications without departing from the claims, the scope and spirit, and any other purposes of the inventive concepts.

An "over-provision area" mentioned here means a system area, which is provided for memory management but is hidden so as not to be seen from the external system using a memory area of a storage device. For example, garbage that is not erased during a garbage collection operation may be accumulated by using the over-provision area. Accordingly, if the size of the over-provision area of the storage device decreases, the performance of the storage device is inevitably deteriorated.

FIG. 1 is a block diagram illustrating a user device according to an embodiment of the inventive concepts. Referring to FIG. 1, a user device includes a host 100 and a storage device 200. The user device may be, for example, any one of a server, a data center, a personal computer, and a mobile device.

The host 100 accesses the storage device 200 to write or read data. The host 100 may provide a command, an address, and data to the storage device 200. The host 100 may request data from the storage device 200 by using a command and an address. For example, the host 100 may include at least one processor. The host 100 may be a processor itself or an electronic device or a system including a processor. In particular, the host 100 may manage a plurality of sub-storage devices 220, 230, and 240 included in the storage device 200 by using a logical address LBA.

The storage device 200 may include a storage controller 210, the plurality of sub-storage devices 220, 230, and 240, and a buffer memory 250. The storage controller 210 controls the plurality of sub-storage devices 220, 230, and 240 in response to a request from the host 100. In response to a read or write request of the host 100, the storage controller 210 accesses the plurality of sub-storage devices 220, 230, and 240 to write or read data.

The storage controller 210 provides a physical connection between the host 100 and the storage device 200. That is, the storage controller 210 provides an interface with the storage device 200 in compliance with the bus format of the host 100. The storage controller 210 distributes the logical address LBA from the host 100 to the plurality of sub-storage devices 220, 230, and 240. For example, the storage controller 210 processes the logical address LBA from the host 100 under a specific mapping rule so as to map the logical address LBA to physical address of the plurality of sub-storage devices 220, 230, and 240. Continuous logical addresses LBA may be sequentially mapped onto the plurality of sub-storage devices 220, 230, and 240. This mapping manner will be described in detail with reference to FIG. 4.

The sub-storage devices 220, 230, and 240 are provided as a storage medium of the storage device 200. Each of the sub-storage devices 220, 230, and 240 may include a controller (or a sub-storage core) and a plurality of flash memory devices. Each of the sub-storage devices 220, 230, and 240 may include a controller for control and address mapping of flash memory devices. For example, the sub-storage device 220 may map the logical address LBA allocated in the storage controller 210 onto each flash memory device.

In addition, a fail may occur in at least one of flash memory devices included in the sub-storage device 220. In this case, the logical address LBA mapped onto a fail flash memory device may be remapped onto an over-provision (OP) area of the sub-storage device 220. Of cause, data of the fail flash memory device may migrate to the over-provision area. In this case, the capacity of the over-provision area of the sub-storage device 220 in which the fail flash memory device exists may decrease relatively. The over-provision area is not provided to the host 100 as the capacity of a user area, but is used for a memory management operation such as a garbage collection operation or a merge operation. Accordingly, a decrease in the size of the over-provision area of the sub-storage device 220 may inevitably cause the relative performance degradation compared with the other sub-storage devices 230 and 240. Also, the performance of the storage device 200 may be determined by the sub-storage device 220, the performance of which is degraded.

When the logical address LBA is mapped from the user area to the over-provision area, the storage controller 210 of the inventive concepts may allow a decrease in the size of the over-provision area of a specific sub-storage device which is not frequently accessed. That is, the logical address LBA may be mapped to the over-provision area of the sub-storage device 230 instead of the typical user area when fails are detected on the user area or when user needs the specific over-provision area as user area. For this mapping, the storage controller 210 may include a hash function pool for selecting a sub-storage device and may dynamically select a hash function based on an input logical address LBA. A workload concentrated on any one sub-storage device may be distributed to other sub-storage device through the above-described dynamic way. Accordingly, the decrease in the over-provision area in any one sub-storage device may be equally divided into the other sub-storage devices 220, 230, and 240. This will be described in detail with reference to the following accompanying drawings.

The buffer memory 250 may be used as a data buffer for data exchange between the storage device 200 and the host 100. In addition, the buffer memory 250 may include a mapping table for address mapping of the sub-storage devices 220, 230, and 240 with the logical address LBA provided to the storage device 200. Whether the logical address LBA provided from the host 100 is repaired (or a fail-in-place) may be listed in the mapping table.

According to the above description, the storage device 200 of the inventive concepts may relive a burden concentrated on any one sub-storage device where the logical address LBA is remapped to the over-provision area instead of the user area.

Figure 2:
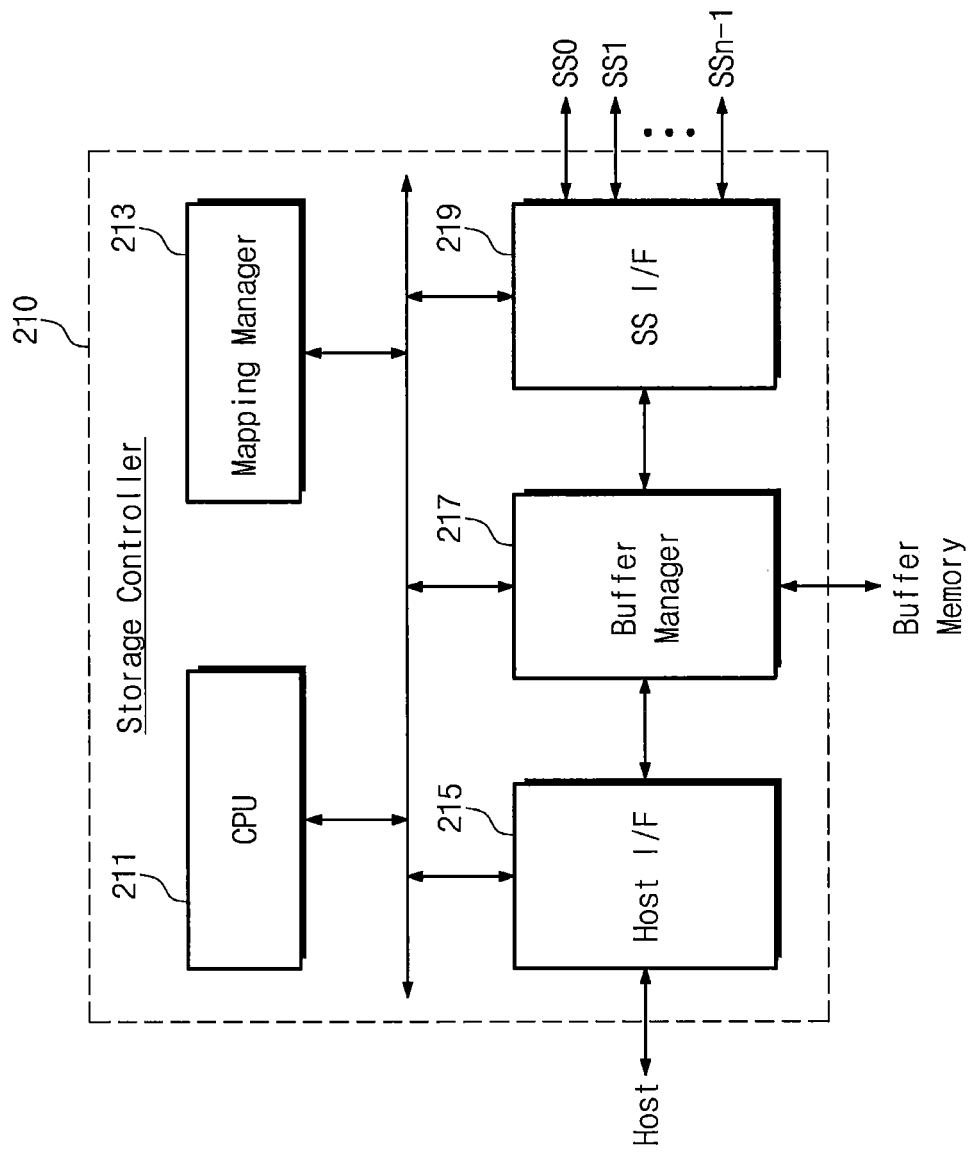
FIG. 2 is a block diagram illustrating a configuration of a storage controller of FIG. 1.

FIG. 2 is a block diagram illustrating a configuration of a storage controller of FIG. 1. Referring to FIG. 2, the storage controller 210 accesses the plurality of sub-storage devices 220, 230, and 240 in response to a command of the host 100 (refer to FIG. 1). The storage controller 210 may include a central processing unit (CPU) 211, a mapping manager 213, a host interface 215, a buffer manager 217, and a sub-storage interface 219.

The CPU 211 may control overall operations of the storage controller 210 and may execute a logical operation. The CPU 211 may communicate with the host 100 through the host interface 215 and with the sub-storage devices 220, 230, and 240 through the sub-storage interface 219. The CPU 211 may manage the buffer memory 250 through the buffer manager 217. The CPU 211 may execute various firmware or software modules of the storage controller 210.

The mapping manager 213 distributes a logical address LBA from the host 100 to a plurality of sub-storage devices SS0 to SSn−1. The mapping manager 213 may distribute the logical address LBA to the sub-storage devices SS0 to SSn−1 by using a specific hash function. For example, the mapping manager 213 may uniformly distribute the logical address LBA to the sub-storage devices SS0 to SSn−1 by using a hash function of (mod n). If the number of sub-storage devices is 4 (n=4) and a logical address is "LBA90", the mapping manager 213 may select the sub-storage device SS2 depending on hash function arithmetic of "90% 4=2". The "LBA % n" arithmetic represents the remainder upon dividing "LBA" by 4.

If a logical address is "LBA91", the mapping manager 213 may select the sub-storage device SS3 depending on a mapping rule of "91% 4=3". However, the above-described mapping manner may be only one embodiment of the inventive concepts. For example, it may be possible to map the logical address LBA onto the sub-storage devices SS0 to SSn−1 by using various algorithms or functions.

In particular, the mapping manager 213 may dynamically change the mapping rule of the logical address LBA such that a decrease in the over-provision area is not concentrated on any one sub-storage device. If a fail or a defect occurs in any one sub-storage device among the sub-storage devices SS0 to SSn−1, a logical address mapped onto a fail device should be mapped onto a normal over-provision area. In this case, the mapping manager 213 may map the logical address LBA by using a dynamic rule such that a decrease in the over-provision area is not concentrated on any one sub-storage device. For example, the mapping manager 213 may select one, which corresponds to the logical address LBA, of the sub-storage devices SS0 to SSn−1 by using a plurality of hash functions. The mapping manager 213 may be implemented with a separate hardware device. However, it may be understood that the mapping manager 213 is provided in the form of firmware or software driven in the CPU 211.

The host interface 215 may be configured to communicate with the host 100 under control of the CPU 211. The host interface 215 may be configured to make communication by using at least one of various communication manners, such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multimedia card (MMC), an embedded MMC (eMMC), mSATA, M.2, and M.3.

The buffer manager 217 may be configured to control the buffer memory 250 (refer to FIG. 1) under control of the CPU 211. The buffer manager 217 controls the buffer memory 250 so as to temporarily store data that the sub-storage devices SS0 to SSn−1 and the host 100 exchange.

The sub-storage interface 219 may be configured to communicate with the sub-storage devices SS0 to SSn−1 under control of the CPU 211. The sub-storage interface 219 may exchange a command, an address, and data with the sub-storage devices SS0 to SSn−1 through an input/output channel. The sub-storage interface 219 may exchange control signals with the sub-storage devices SS0 to SSn−1 through a control channel.

The storage controller 210 of the above-described configuration may basically access the plurality of sub-storage devices 220, 230, and 240 and the buffer memory 250. The storage controller 210 may perform a write operation, a read operation, and an erase operation in response to an external request. The storage controller 210 may write write-requested data in the sub-storage devices 220, 230, and 240 and may read and output read-requested data from the sub-storage devices 220, 230, and 240.

There is briefly described a function of the storage controller 210 that allows a decrease in an over-provision area not to be concentrated on a specific sub-storage device when a specific event occurs in the storage device 200 of the inventive concepts. In addition, the storage device 200 may be implemented in the form of any one of an SSD, a memory card, and an embedded memory card. However, embodiments of the inventive concepts may not be limited thereto.

Figure 3:
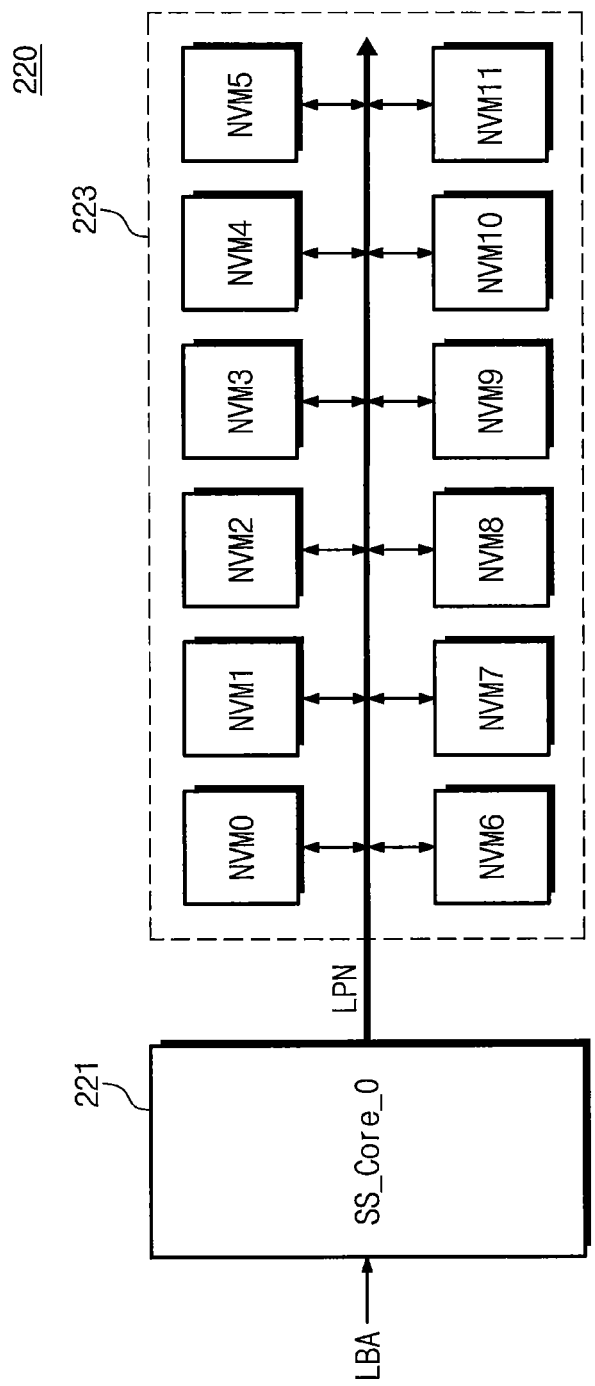
FIG. 3 is a block diagram illustrating a configuration of a sub-storage device of the inventive concepts.

FIG. 3 is a block diagram illustrating a configuration of a sub-storage device of the inventive concepts. Referring to FIG. 3, for example, the sub-storage device 220 may include a sub-storage core 221 and a plurality of nonvolatile memory devices 223.

The sub-storage core 221 may convert a logical address LBA from the storage controller 210 to a logical page address LPN corresponding to each of the nonvolatile memory devices NVM0 to NVM11. The logical page address LPN is a logical address of the sub-storage device 220. The logical address LBA provided from the host 100 is mapped onto the logical page address LPN in a one-to-one relationship. That is, the logical page address LPN is a logical address belonging to the sub-storage device 220.

Under control of the sub-storage core 221, each of the nonvolatile memory devices NVM0 to NVM11 may store data or may output the stored data. For example, each of the nonvolatile memory devices NVM0 to NVM11 may be implemented with a flash memory chip (or die). However, it may be understood that the plurality of nonvolatile memory devices NVM0 to NVM11 are implemented with another kind of nonvolatile memory chips (e.g., PRAM, RRAM, or MRAM). Each of the flash memory chips used to implement the plurality of nonvolatile memory devices NVM0 to NVM11 may store 1-bit data or M-bit data (M being an integer of 2 or more) per cell.

The sub-storage core 221 determines whether the logical address LBA provided from the storage controller 210 is an address to be repaired. If it is determined that the logical address LBA is an address to be repaired, the sub-storage core 221 may use a hash function for assigning the logical page address LPN to an over-provision area. However, if the logical address LBA is not an address to be repaired, the sub-storage core 221 may assign the logical page address LPN to a user area.

Figure 4:
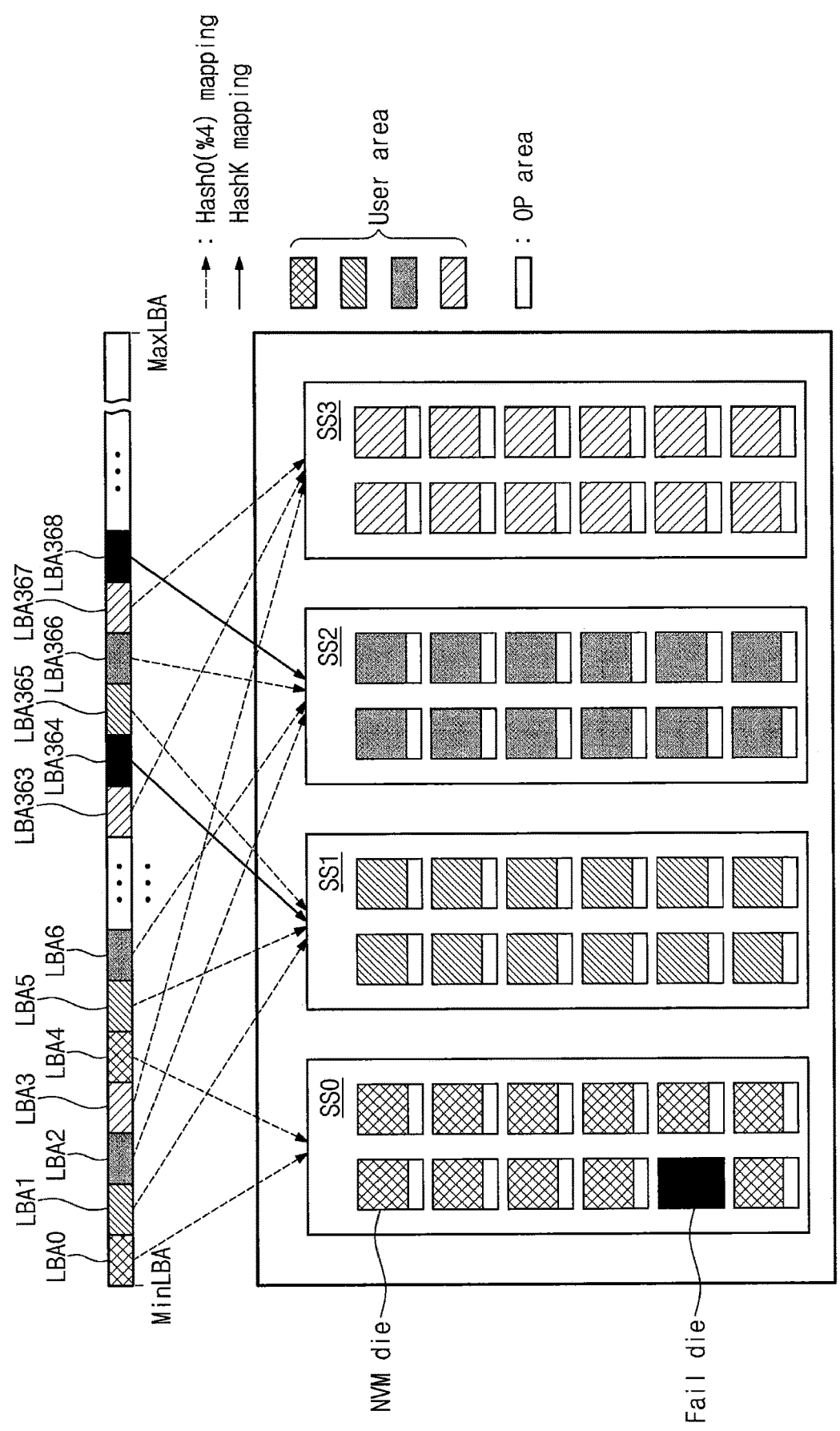
FIG. 4 is a view illustrating a logical address mapping method of the storage controller according to an embodiment of the inventive concepts.

FIG. 4 is a view illustrating a logical address mapping method of a storage controller according to an embodiment of the inventive concepts. Referring to FIG. 4, the storage controller 210 maps specific logical addresses (e.g., LBA364 and LBA368) onto sub-storage devices by using a hash function different from a hash function of normal logical addresses. This will be described in more detail below.

It is assumed that a fail die is present in the sub-storage device SS0 and logical addresses corresponding to the fail die correspond to "LBA364" and "LBA368", respectively. In this case, the storage controller 210 may map the logical addresses corresponding to the fail die onto logical page addresses LPN of an over-provision area of the same sub-storage device SS0. However, the performance degradation is inevitable in the case where the use of the over-provision area is concentrated on the sub-storage device SS0.

The storage controller 210 of the inventive concepts maps the specific logical addresses (e.g., LBA364 and LBA368) onto sub-storage devices by using a rule different from a rule of normal logical addresses. That is, normal logical addresses are mapped onto sub-storage devices by using a fixed selection rule (or a default hash function). However, in the case of the specific logical addresses (e.g., LBA364 and LBA368), any one selected from a plurality of hash functions may be used to map the specific logical addresses onto sub-storage devices.

For example, a default hash function Hash0 may be applied to normal logical addresses that are not mapped onto the fail die. That is, if mod-4 is applied to a normal logical address LBA0 (0% 4=0), the sub-storage device SS0 may be selected. If mod-4 is applied to a normal logical address LBA1 (1% 4=1), the sub-storage device SS1 may be selected.

However, in the case of the logical addresses LBA364 and LBA368, any one hash function may be selected from a hash function pool instead of the default hash function Hash0. For example, any one HashK of a plurality of hash functions may be applied to the logical address LBA364 corresponding to the fail die. That is, if the default hash function is applied to the logical address LBA364, 364% 4=0, and thus, the sub-storage device SS0 may be selected. However, if the hash function HashK different from the default hash function Hash0 is applied, the logical address LBA364 may be mapped onto the sub-storage device SS1. For example, if a hash function HashK (=%4+1) is used, the logical address LBA364 may be mapped onto the sub-storage device SS1 depending on an arithmetic result "1" of "364% 4+1". If a hash function HashK (=%4+2) is applied to the logical address LBA368, the sub-storage device SS2 may be selected.

A logical address (LBA) mapping method available for repair after a fail die occurs is described above. However, the inventive concepts may not be limited thereto. Besides processing of the fail die, in the case where it is expected that the use of an over-provision area is concentrated on any one sub-storage device, the mapping method using a plurality of hash functions, according to the inventive concepts, may be applied in various manners.

Figure 5:
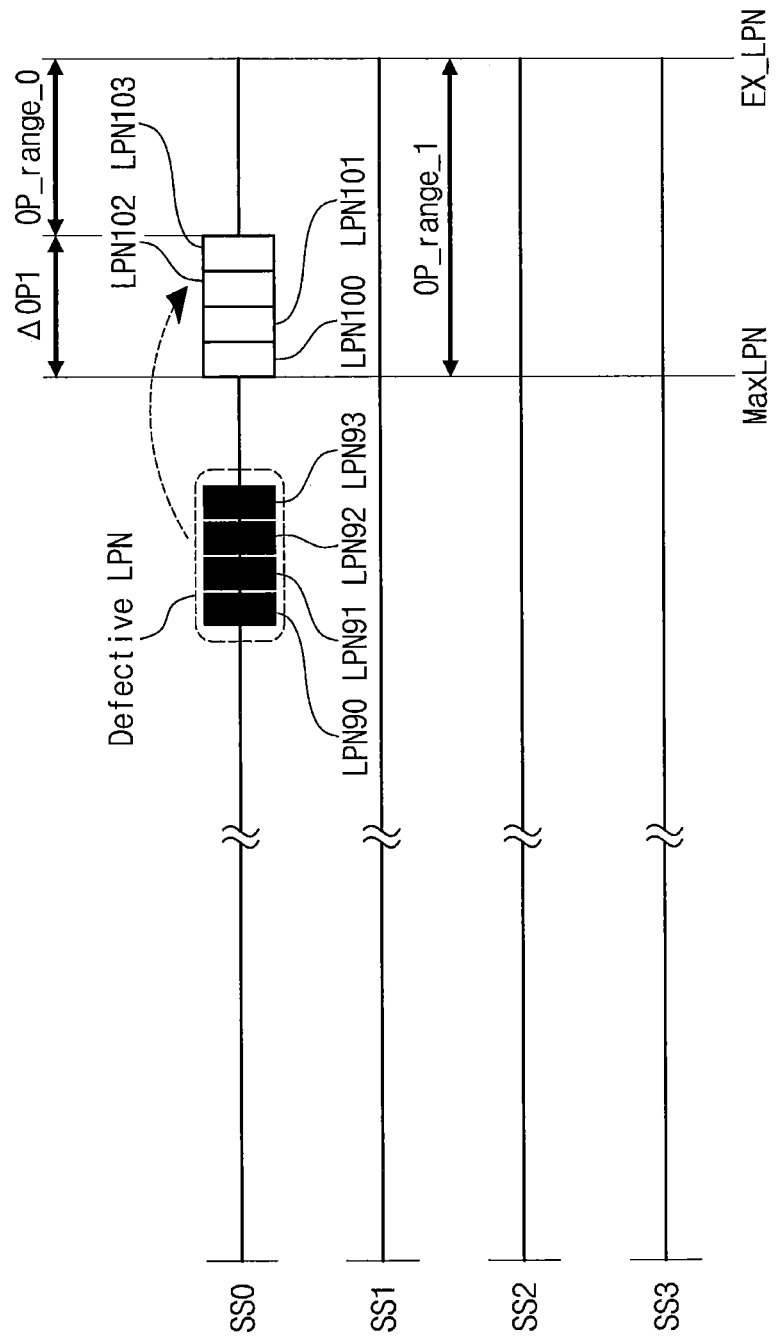
FIGS. 5 and 6 are views illustrating a method of dynamically distributing logical addresses, according to the inventive concepts.
Figure 6:
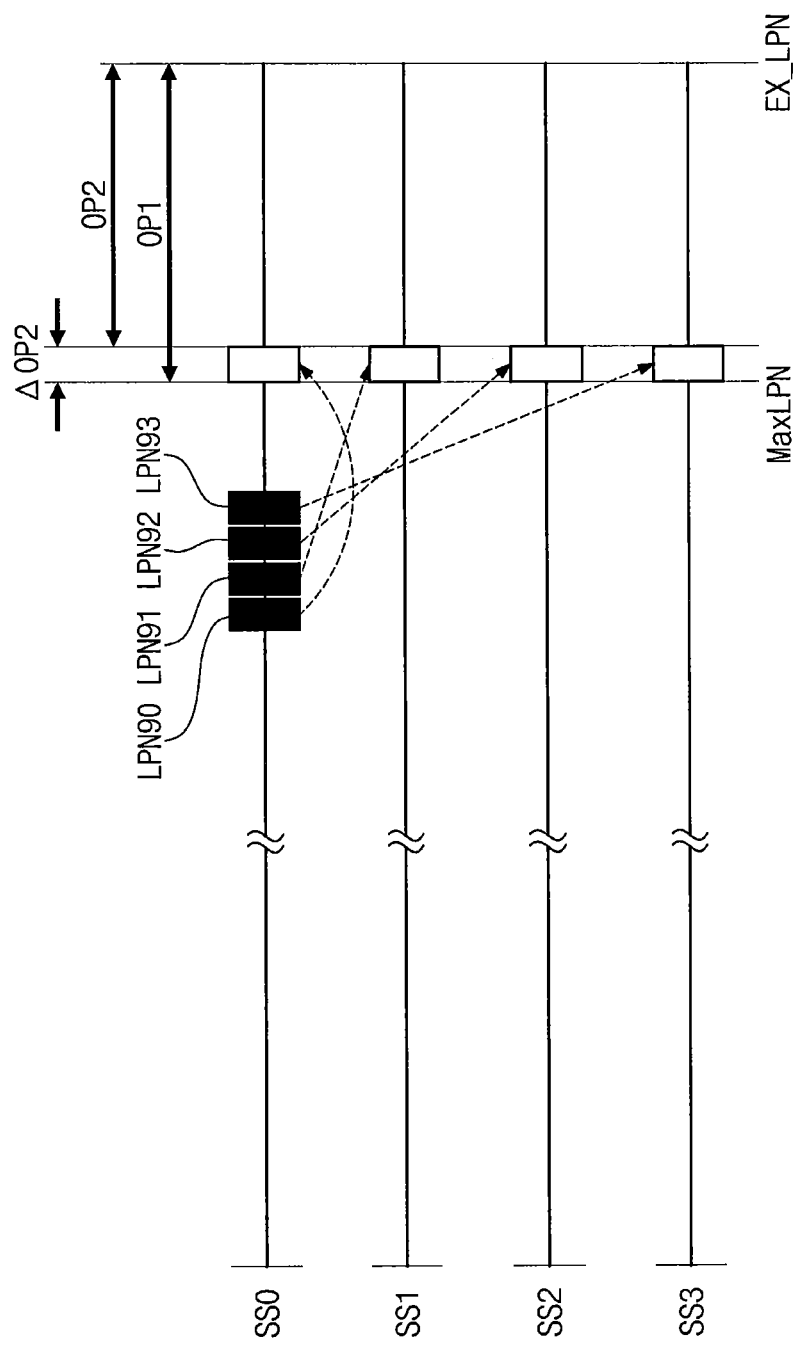

FIGS. 5 and 6 are views illustrating a method of dynamically distributing logical addresses, according to the inventive concepts. FIG. 5 illustrates a method of repairing a defective logical page address occurring when a storage device of the inventive concepts includes a plurality of sub-storage devices. FIG. 6 illustrates a method of dynamically distributing logical addresses such that the use of an over-provision area is not concentrated on any one sub-storage device under the condition of FIG. 5.

Referring to FIG. 5, if a fail die occurs in the sub-storage device SS0, a logical page address LPN mapped onto the fail die is a defective logical page address. Afterwards, the defective logical page address is mapped onto a memory area used as an over-provision area upon rewriting the defective logical page address at a host. That is, the defective logical page address is replaced with an address of any area belonging to the over-provision area.

For example, it is assumed that a maximum logical page address MaxLPN of a user area of the sub-storage device SS0 is "LPN99" and defective logical page addresses are LPN90, LPN91, LPN92, and LPN93. In this case, the defective logical page addresses LPN90, LPN91, LPN92, and LPN93 may be replaced with logical page addresses LPN100, LPN101, LPN102, and LPN103 of the over-provision area, respectively. As a result, the over-provision area OP_range_0 of the sub-storage device SS0 may decrease by "ΔOP1" compared with the over-provision area OP_range_1 of each of the sub-storage devices SS1, SS2, and SS3. Accordingly, as the over-provision area OP_range_0 provided for a memory management operation abruptly decreases, and the performance of the sub-storage device SS0 may be degraded compared with other sub-storage devices SS1, SS2, and SS3. The performance degradation of the sub-storage device SS0 may have a critical effect on the performance of the storage device 200.

Referring to FIG. 6, the defective logical page addresses LPN90, LPN91, LPN92, and LPN93 may be distributed to over-provision areas of all the sub-storage devices SS0, SS1, SS2, and SS3 included in the storage device 200. That is, the defective logical page address LPN90 is replaced with a logical page address (higher than MaxLPN) of the over-provision area of the sub-storage device SS0. The defective logical page address LPN91 is replaced with a logical page address (higher than MaxLPN) of the over-provision area of the sub-storage device SS1. The defective logical page address LPN92 is replaced with a logical page address (higher than MaxLPN) of the over-provision area of the sub-storage device SS2. The defective logical page address LPN93 is replaced with a logical page address (higher than MaxLPN) of the over-provision area of the sub-storage device SS3.

As a result, the over-provision areas of the sub-storage devices SS0, SS1, SS2, and SS3 may be used to replace the defective logical page addresses LPN90, LPN91, LPN92, and LPN93. In this case, the over-provision areas of the sub-storage devices SS0, SS1, SS2, and SS3 may decrease by the same size ΔOP2. That is, a decrease in an over-provision area may not be concentrated on any one sub-storage device. Accordingly, it may be possible to relieve performance degradation caused by concentrated use of the over-provision areas in one sub-storage device among the sub-storage devices SS0, SS1, SS2, and SS3.

A mapping method to distribute defective logical page addresses to the over-provision areas of the sub-storage devices SS0, SS1, SS2, and SS3 is described above. However, defective logical page addresses may be provided as a plurality of logical addresses LBA in a host. If it is determined that a logical address is defective, a dynamic mapping method in which a sub-storage device is selected in the manner illustrated in FIG. 6 may be executed.

FIGS. 7A and 7B are views illustrating mapping tables according to an embodiment of the inventive concepts. FIG. 7A illustrates a part of a mapping table for selecting a sub-storage device by the storage controller 210. FIG. 7B is a table illustrating a hash pool for selecting a sub-storage device in the inventive concepts.

Referring to FIG. 7A, the storage controller 210 may dynamically change a rule to select a sub-storage device depending on whether a logical address LBA provided from the host 100 is defective. If the logical address LBA is provided, the storage controller 210 may determine whether the logical address LBA is a defective address to be repaired in the mapping table. If it is determined to be defective and thus the input logical address LBA is an address to be repaired (in the case where a FiP field is "1"), a sub-storage device may be selected by one of a plurality of hash functions H0, H1, H2, and H3. If it is determined that the input logical address LBA is not a defective address (in the case where a FiP field is "0"), a sub-storage device may be selected by a default hash function H0. It may be understood that an ID and a signature of a hash function are provided in the mapping table.

Referring to FIG. 7B, hash functions that are used when the storage controller 210 selects a sub-storage device are exemplified. For example, the hash function H0 may be used to select a sub-storage device by using mod-4 division with regard to the input logical address LBA. That is, the hash function H0 is a function to provide the remainder of the division of the logical address LBA by 4 as a number of a sub-storage device. The hash function H0 may be provided as a default hash function applied to normal logical addresses that are unnecessary for repair.

The hash function H1 is a function to provide a sum of "1" and the remainder of the division of the logical address LBA by 4 as a number of a sub-storage device. The hash function H2 is a function to provide a sum of "2" and the remainder of the division of the logical address LBA by 4 as a number of a sub-storage device. The hash function H3 is a function to provide a sum of "3" and the remainder of the division of the logical address LBA by 4 as a number of a sub-storage device.

If it is determined that the logical address LBA provided from the host 100 is not an address to be repaired, the storage controller 210 may select a sub-storage device by using the default hash function H0. In contrast, if it is determined that the logical address LBA provided from the host 100 is an address to be repaired, the storage controller 210 may select a sub-storage device by using any one of the default hash function H0 and the plurality of hash functions H1, H2, and H3. A reference for selecting the hash functions H1, H2, and H3 may be determined in consideration of optimum performance of distribution in a write operation, and the determined selection reference may be updated in the mapping table as a hash ID. In a read operation, the storage controller 210 may access over-provision areas of a plurality of sub-storage devices selected by using the hash ID updated in the mapping table.

Figure 8:
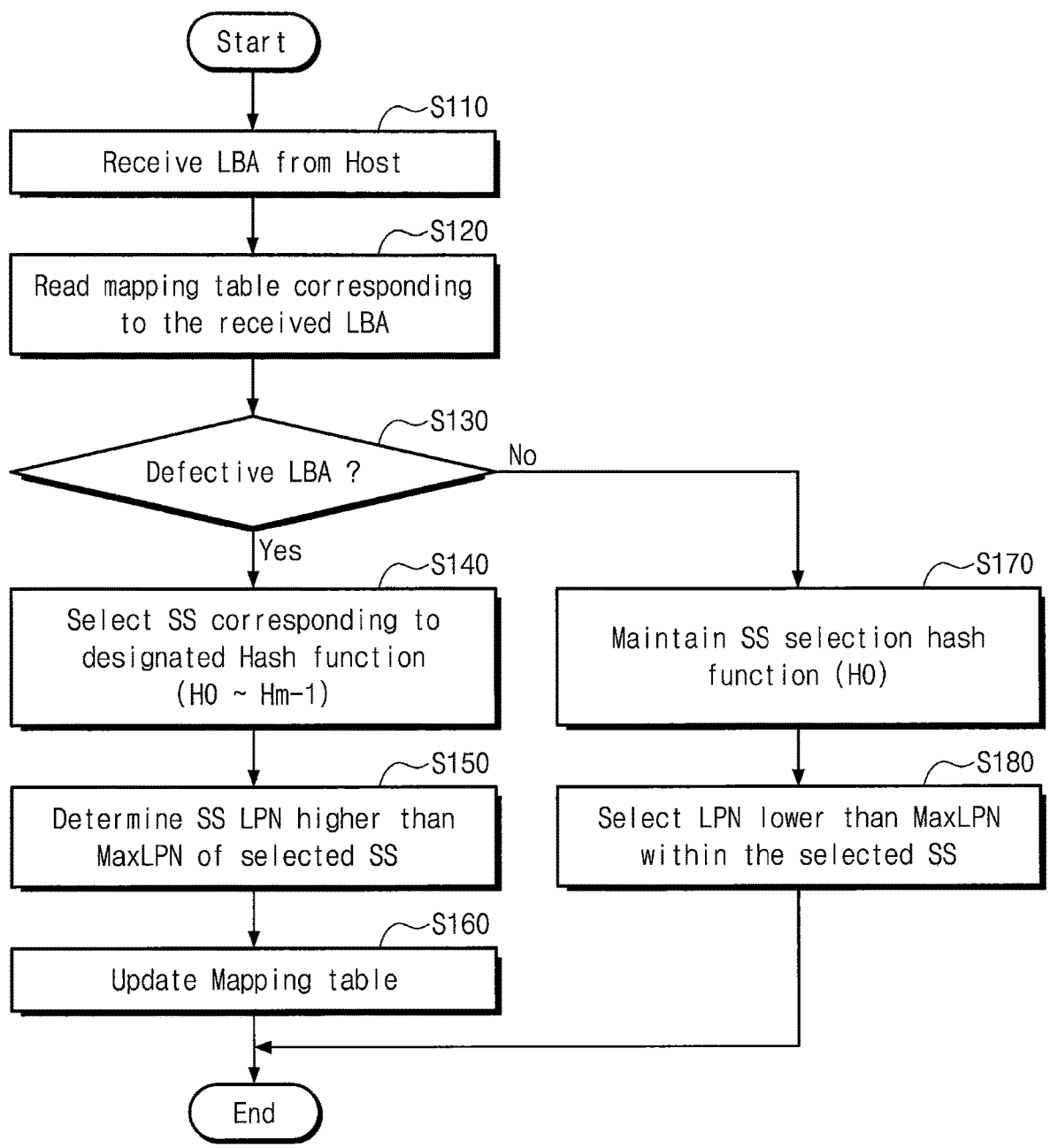
FIG. 8 is a flowchart illustrating a method of dynamically selecting the sub-storage device, according to an embodiment of the inventive concepts.

FIG. 8 is a flowchart illustrating a method of dynamically selecting a sub-storage device, according to an embodiment of the inventive concepts. Referring to FIG. 8, the storage device 200 including a plurality of sub-storage devices may dynamically adjust a rule to select a sub-storage device with respect to a specific logical address LBA. It may be possible to prevent a decrease in an over-provision area from being concentrated on any one sub-storage device through the adjustment.

In operation S110, the storage device 200 receives a logical address LBA provided from the host 100 together with a command. Here, the command may be a write command, a read command, an erase command, etc., but the inventive concepts are not limited thereto.

In operation S120, the storage device 200 may read a mapping table to check overall mapping information about the received logical address LBA. The storage controller 210 may read whether the logical address LBA provided from the host 100 is defective and a hash ID from the mapping table.

In operation S130, the storage controller 210 may determine whether the logical address LBA is mapped onto a fail die. The storage controller 210 branches based on the information read from the mapping table. For example, if it is determined that the logical address LBA is mapped onto the fail die (Yes), the process proceeds to operation S140. In contrast, if it is determined that the logical address LBA is not mapped onto the fail die (No), the process proceeds to operation S170.

In operation S140, the storage controller 210 selects a hash function corresponding to a hash ID obtained from the mapping table. For example, "m" hash functions H0 to Hm−1 (m being a natural number) may be provided in a hash function pool. The storage controller 210 may select any one, which corresponds to the hash ID, of the "m" hash functions. The storage controller 210 may apply the selected hash function to the received logical address LBA to select a sub-storage device.

In operation S150, the storage controller 210 or a sub-storage core SS Core of the selected sub-storage device determines a logical page address LPN of the selected sub-storage device. In particular, a logical page address, which is higher than a maximum logical page address MaxLPN of a user area, of logical page addresses LPN allocated to the selected sub-storage device should be mapped onto the logical address LBA received in operation S110. As a logical page address of an over-provision area, which is higher than the maximum logical page address MaxLPN, is mapped, an over-provision area of the selected sub-storage device may be used.

In operation S160, the storage controller 210 may update a mapping relationship between the logical address LBA and the logical page address LPN in the mapping table. If the mapping table is completely updated, the procedure for distributing and mapping logical addresses LBA mapped onto the fail die to sub-storage devices ends.

In operation S170, the storage controller 210 maintains the default hash function H0. For example, the storage controller 210 may select a sub-storage device by using the hash function H0 for mapping a normal logical address LBA.

In operation S180, the storage controller 210 or a sub-storage core SS Core of the selected sub-storage device determines a logical page address LPN of the selected sub-storage device. A logical page address, which is lower than the maximum logical page address MaxLPN of the user area, of logical page addresses LPN allocated to the selected sub-storage device may be mapped onto the logical address LBA received in operation S110.

A method of dynamically changing a rule to select a sub-storage device, according to an embodiment of the inventive concepts, is described above. In the embodiment of the inventive concepts, an example in which a selection rule is dynamically changed to remap a logical address LBA mapped onto a fail die is described. However, the inventive concepts may not be limited thereto. For example, it may be possible to select one of a plurality of hash functions for selecting a sub-storage device, which are provided according to various purposes.

Figure 9:
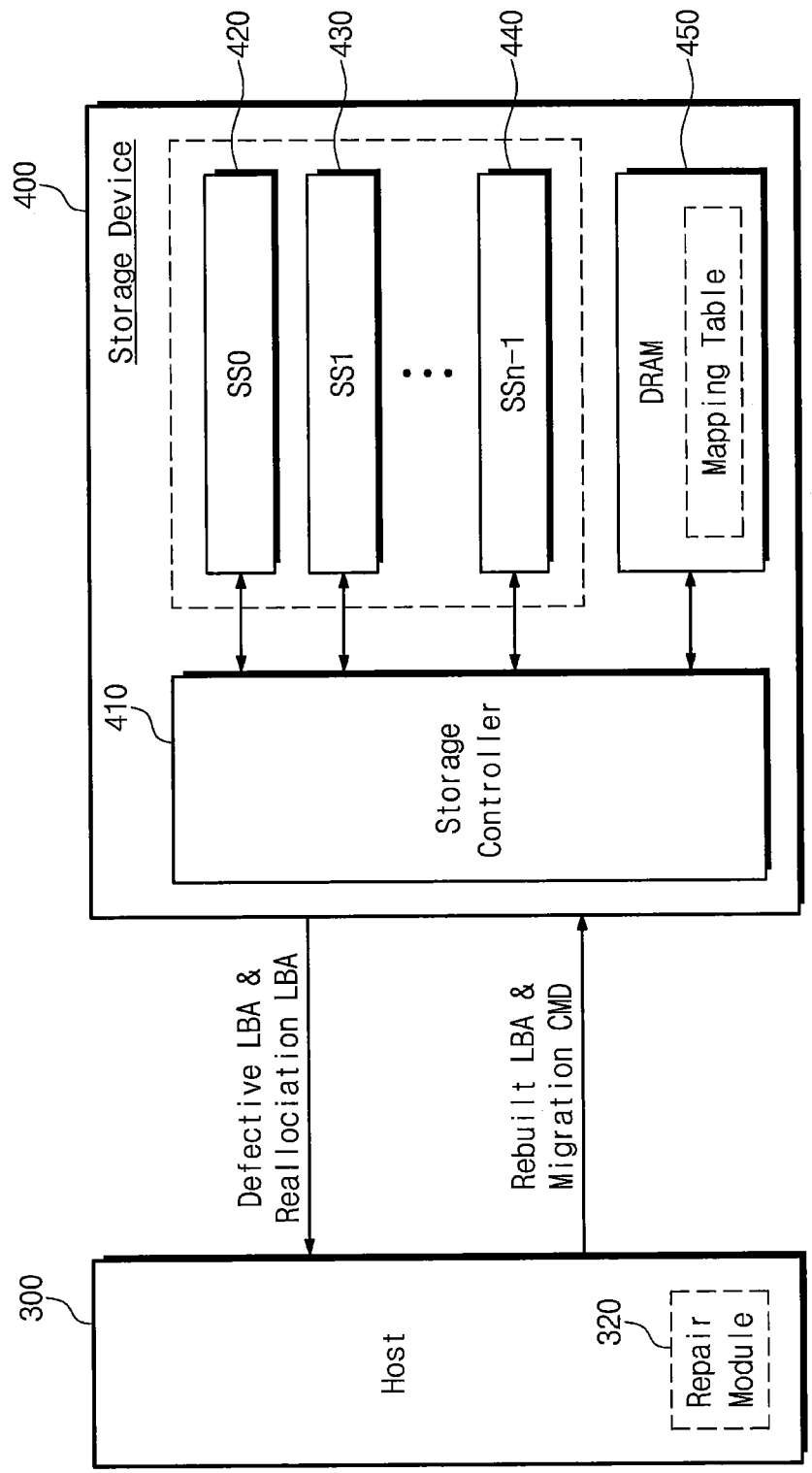
FIG. 9 is a block diagram illustrating the user device according to another embodiment of the inventive concepts.

FIG. 9 is a block diagram illustrating a user device according to another embodiment of the inventive concepts. Referring to FIG. 9, a user device includes a host 300 and a storage device 400. The storage device 400 may transmit a defective logical address and a reallocated logical address to the host 300. The host 300 may receive the defective logical address and the reallocated logical address, and may repair data at a necessary time and write the repaired data in the storage device 400.

Here, the defective logical address may be a logical address that needs to be repaired due to a fail such as complete fail of the die. The reallocation logical address indicates an address of a user area for copying data of the defective logical address. Data of the defective logical address repaired later may be copied to a memory area of the reallocated logical address.

The host 300 accesses the storage device 400 to write or read data. The host 300 may provide a command, an address, and data to the storage device 400. The host 300 may request data from the storage device 400 by using a command or an address. In particular, the host 300 may be provided with the defective logical address and the reallocation logical address from the storage device 400. The host 300 may perform a repair operation on data of a fail die or a fail area with reference to the defective logical address. Data of the fail die or the fail area may be repaired under control of a repair module 320 included in the host 300. The repair module 320 may be implemented with a hardware or software module capable of repairing data by using an error correction algorithm or a RAID scheme.

The host 300 may write the repaired data in the memory area of the reallocated logical address and may change a mapping relationship. Data that previously exists in a memory area of the reallocated logical address may migrate to an over-provision area of another sub-storage device, not a sub-storage device including the fail die.

The host 300 may control the storage device 400 so as to move the changed mapping relationship of the defective logical address and the reallocated logical address and the repaired data. In this case, the host 300 may repeatedly perform read and write operations for the purpose of performing data migration by using the defective logical address and the reallocated logical address or may request data migration from the storage device 400 by using a separate command.

The storage device 400 may include a storage controller 410, the plurality of sub-storage devices 420, 430, and 440, and a buffer memory 450. The storage controller 410 controls the plurality of sub-storage devices 420, 430, and 440 in response to a request from the host 300. In response to a read or write request of the host 300, the storage controller 410 accesses the plurality of sub-storage devices 420, 430, and 440 to write or read data.

In particular, the storage device 400 may notify the host 300 of a defective logical address occurring when a fail die or a fail memory area exists. Also, the storage device 400 may notify the host 300 of a reallocated logical address, at which data present in the memory area of the defective logical address are to be copied. The host 300 may repair data of the defective logical address at a necessary time and may write the repaired data in a memory area of the reallocated logical address. In addition, data of the reallocated logical address may be copied to over-provision areas of other sub-storage devices, from which a fail is absent, at a necessary time by the host 300.

According to the above description, the storage device 400 of the inventive concepts may not autonomously perform a repair operation on a defective logical address. Instead, the storage device 400 may transfer a defective logical address and a reallocated logical address to the host 300 such that the host 300 repairs data of a memory area, in which a fail is present, at a necessary time. In the case where data is previously present in a memory area of the reallocated logical address, the data may migrate to an over-provision area of a normal sub-storage device, and a mapping relationship may also be corrected. Accordingly, a decrease in an over-provision area occurring in any one sub-storage device may be distributed to over-provision areas of a plurality of sub-storage devices. As a result, performance degradation due to concentrated over-provision area use on any one sub-storage device may be relieved.

Figure 10:
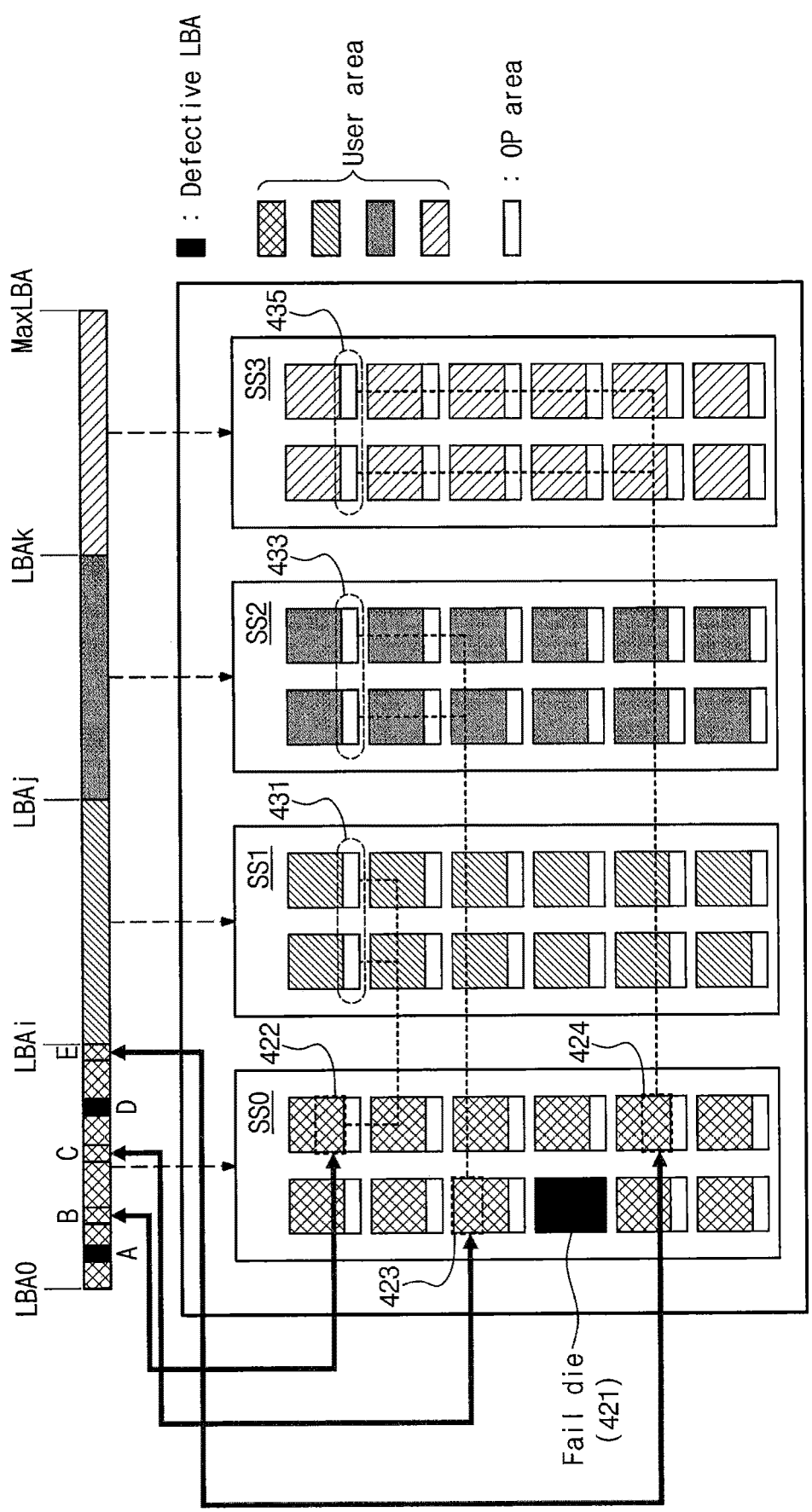
FIG. 10 is a view illustrating a logical address mapping method according to an embodiment of the inventive concepts.

FIG. 10 is a view illustrating a logical address mapping method according to an embodiment of the inventive concepts. Referring to FIG. 10, the storage controller 410 notifies the host 300 of defective logical addresses "A" and "D" and reallocated logical addresses "B", "C", and "E". In this case, the host 300 may perform defective data repair and data migration at a necessary time.

It is assumed that a fail die 421 is present in the sub-storage device SS0 and defective logical addresses corresponding to the fail die 421 are "A" and "D", respectively. Data of the defective logical address "A" and "D" corresponding to the fail die 421 may be copied to a memory area of the same sub-storage device SS0 after being repaired. Addresses of memory areas in which repaired data of the defective logical addresses "A" and "D" are stored are reallocated logical addresses "B", "C", and "E".

Any logical addresses or fixed logical addresses of the sub-storage device SS0 may be used as the reallocated logical addresses "B", "C", and "E". However, an area to which data stored at the reallocated logical addresses "B", "C", and "E" migrate is an over-provision area of each of the sub-storage devices SS1, SS2, and SS3. That is, a memory area 422 corresponding to the reallocated logical address "B" may be remapped onto an over-provision area 431 of the sub-storage device SS1. Accordingly, data stored in the memory area 422 of the reallocated logical address "B" may be migrated to the over-provision area 431 of the sub-storage device SS1. The data migration may be performed by the host 300 at an appropriate time.

A memory area 423 designated by the reallocated logical address "C" may be remapped onto an over-provision area 433 of the sub-storage device SS2. In addition, data stored in the memory area 423 of the reallocated logical address "C" may be migrated to the over-provision area 433 of the sub-storage device SS2. A memory area 424 designated by the reallocated logical address "E" may be remapped onto an over-provision area 435 of the sub-storage device SS3. Data stored in the memory area 424 of the reallocated logical address "E" may be migrated to the over-provision area 435 of the sub-storage device SS3.

Repairing of data corresponding to the defective logical addresses "A" and "D", migration of the repaired data to areas of the reallocated logical addresses "B", "C", and "E", and migration of data in the reallocated logical addresses "B", "C", and "E" to over-provision areas may be performed by the host 300. The storage device 400 only notifies the host 300 of the defective logical addresses "A" and "D" and the reallocated logical addresses "B", "C", and "E". Accordingly, it may be possible to minimize the performance degradation due to data migration and adjustment of a mapping table. Additionally, as data repair and data migration are performed by the host 300 at a necessary time, it may be possible to manage the storage device 400 flexibly.

Figure 11:
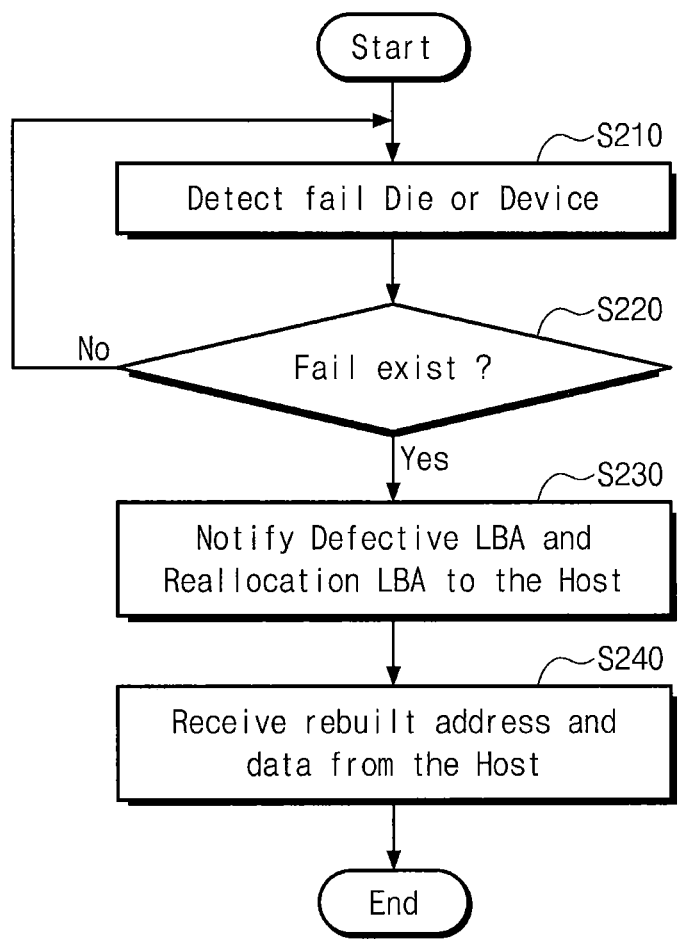
FIG. 11 is a flowchart illustrating an operation of notifying a defective logical address and a reallocated logical address of the storage device of the inventive concepts.

FIG. 11 is a flowchart illustrating an operation of notifying a defective logical address and a reallocated logical address of a storage device of the inventive concepts. Referring to FIG. 11, the storage device 400 including a plurality of sub-storage devices notifies the host 300 of a defective logical address and a reallocated logical address corresponding to a fail die or a fail memory area. The following processing may be performed by the host 300, and the storage device 400 may process a defective logical address and a reallocated logical address under control of the host 300. It may be possible to prevent a concentrated use of an over-provision area in one sub-storage device while minimizing a burden of the storage device 400 through a set of operations described above.

In operation S210, the storage device 400 detects whether a fail is present in a plurality of sub-storage devices. For example, the storage device 400 detects whether a sub-storage device including a fail die or a fail memory area is present in the plurality of sub-storage devices. The fail die or the fail memory area may be detected based on error information that is generated upon writing or reading data.

In operation S220, the storage device 400 may branch depending on whether a fail exists. If it is determined that a fail is present in at least one of the sub-storage devices (Yes), the process proceeds to operation S230. However, if it is determined that a fail is absent from the plurality of sub-storage devices (No), the process proceeds to operation S210.

In operation S230, the storage device 400 notifies the host 300 of the defective logical address and the reallocated logical address. The defective logical address is a logical address corresponding to a fail die or a fail memory area. The reallocated logical address is an address of a user area in a sub-storage device, which is provided for repair of the defective logical address. The host 300 that receives the defective logical address and the reallocated logical address may adjust mapping of logical addresses for repairing of defective data and data migration. The host 300 may transfer the adjusted logical address and the rebuilt data to the storage device 400.

In operation S240, the storage device 400 may write the rebuilt data in a memory area corresponding to the reallocated logical address of the sub-storage device. The storage device 400 may move data previously existing in a memory area of the reallocated logical address to over-provision areas of sub-storage devices from which a fail is absent. A set of operations described above may be performed through a read/write command of the host 300 or may be performed by a separately defined command.

A way to distribute over-provision areas through transmitting a defective logical address and a reallocated logical address of the storage device 400 to the host 300 is described above. If notifying the defective logical address and the reallocated logical address, the storage device 400 does not need to perform mapping and repair operations separately. Since a repair operation and a mapping adjustment operation are performed in the host 300, the burden of the storage device 400 may be reduced.

Figure 12:
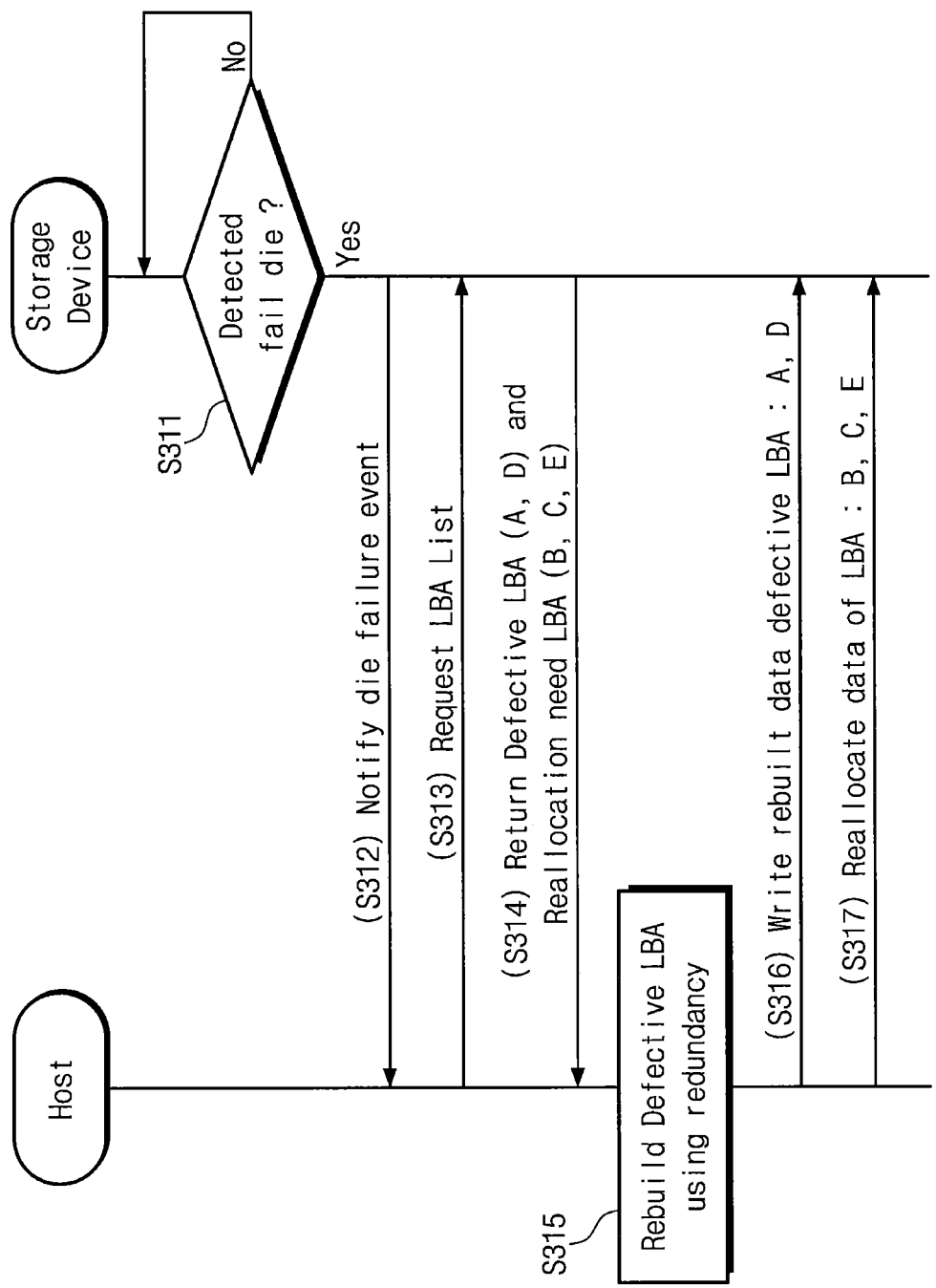
FIG. 12 is a view illustrating an interaction of a host and the storage device for distribution of over-provision areas of FIG. 10.

FIG. 12 is a view illustrating an interaction of a host and a storage device for distribution of over-provision areas of FIG. 10. Referring to FIGS. 10 and 12, the host 300 is provided with a defective logical address and a reallocated logical address from the storage device 400. The storage device 400 may include a plurality of sub-storage devices SS0, SS1, SS2, and SS3.

In operation S311, the storage device 400 may detect a fail die or a fail memory area. The fail die or the fail memory area may be detectable upon performing an access operation of each nonvolatile memory device, such as a read operation, a write operation, or an erase operation. That is, the storage device 400 may detect a fail based on a sign of failure of the write operation, a sign of failure of the read operation, a sign of occurrence of an uncorrectable error, etc. If a fail is not detected (No), the storage device 400 may continue to detect a fail.

If a fail die is detected (Yes), in operation S312, the storage device 400 notifies the host 300 that a failure event occurs. Alternatively, the storage device 400 may notify the host 300 of occurrence of the failure event in response to a synchronous or asynchronous event request from the host 300.

In operation S313, the host 300 requests a logical address list from the storage device 400 in response to the notification of the failure event. That is, the host 300 may request the defective logical address and the reallocated logical address from the storage device 400.

In operation S314, the storage device 400 returns defective logical addresses (e.g., "A" and "D" of FIG. 10) corresponding to a fail die or a fail area to the host 300 in response to the request of the host 300. The storage device 400 may transfer the reallocated logical addresses "B", "C", and "E", at which data of the defective logical addresses "A" and "D" migrate, to the host 300.

In operation S315, the host 300 may rebuild data of the defective logical addresses "A" and "D". For example, the host 300 may rebuild data stored at the defective logical addresses "A" and "D" by using the RAID or a separate error correction means.

In operation S316, the host 300 may write the rebuilt data at newly mapped logical addresses "A" and "D". Data of the defective logical addresses "A" and "D" may be rebuilt by the host 300, and the rebuilt data may be allocated to memory areas designated by the reallocated logical addresses "B", "C", and "E".

In operation S317, the host 300 may move data stored at the reallocated logical addresses "B", "C", and "E" to over-provision areas of the sub-storage devices SS1, SS2, and SS3. Accordingly, a decrease in an over-provision area of the sub-storage device SS0 due to an event such as a fail die may be minimized. Here, it may be understood that an order of operation S316 and operation S317 is exchanged.

Figure 13:
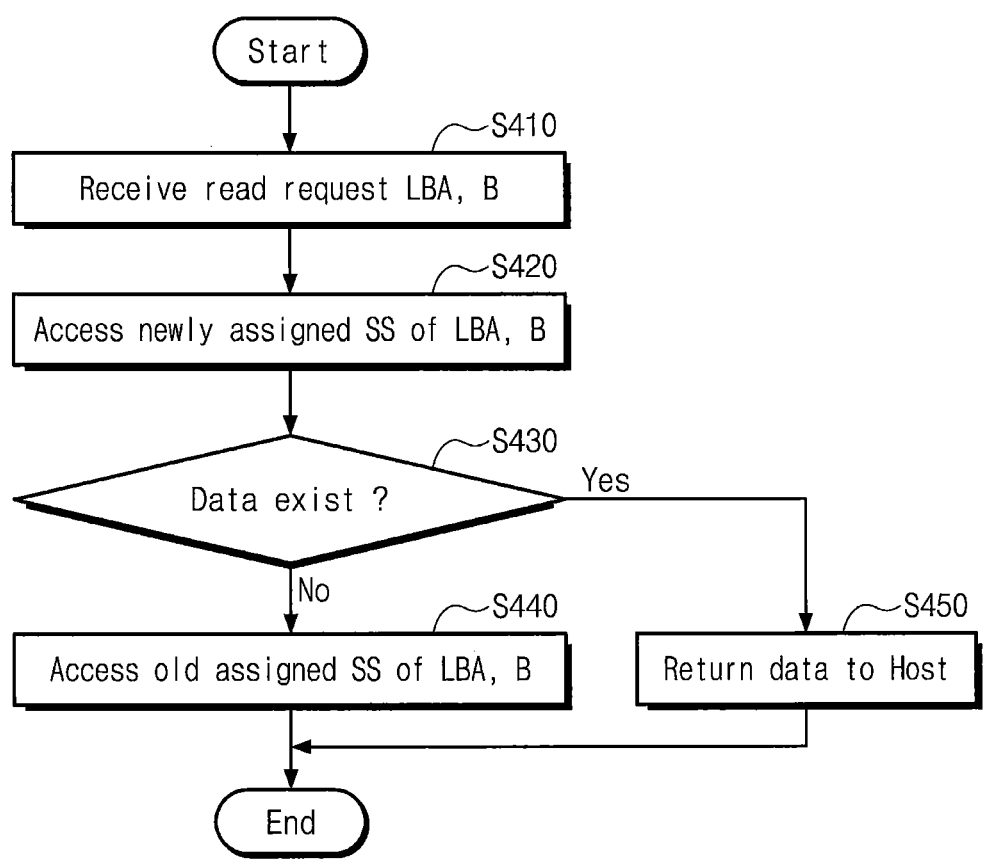
FIG. 13 is a flowchart illustrating an operation when rebuilding by the host of FIG. 12 or a mapping table of logical addresses is not updated.

FIG. 13 is a flowchart illustrating an operation when rebuilding by a host of FIG. 12 or a mapping table of logical addresses is not updated. In FIG. 12, operation S316 or operation S317 may be performed at a time when the host 300 determines that operation S316 or operation S317 is necessary. Accordingly, data corresponding to the defective logical addresses "A" and "D" or the reallocated logical addresses "B", "C", and "E" may be requested before operation S316 or operation S317 is performed. Here, it is assumed that data of the reallocated logical address "B" are requested from the host 300.

In operation S410, the storage device 400 receives a read command and a logical address "B" from the host 300.

In operation S420, the storage device 400 may access a sub-storage device with reference to an address remapped by the host 300. For example, the storage device 400 may access the over-provision area 431 (refer to FIG. 10) onto which the logical address "B" is mapped.

In operation S430, the storage device 400 determines whether data are present in the over-provision area 431. If data migration is not performed, data to be read may be absent from the over-provision area 431. In this case, the process proceeds to operation S440. In contrast, if data are present in the newly remapped over-provision area (Yes), since data migration by the host 300 is completed, the process proceeds to operation S450.

In operation S440, the storage device 400 may access a memory area before data migration of the reallocated logical address "B" with reference to a mapping table. For example, the storage device 400 may access the memory area 422 (refer to FIG. 10) to read data.

In operation S450, the storage device 400 may return data read from a memory area where the data migration is completed, to the host 300.

The process when data of a reallocated logical address are requested before data migration by the host 300 is described above.

Figure 14:
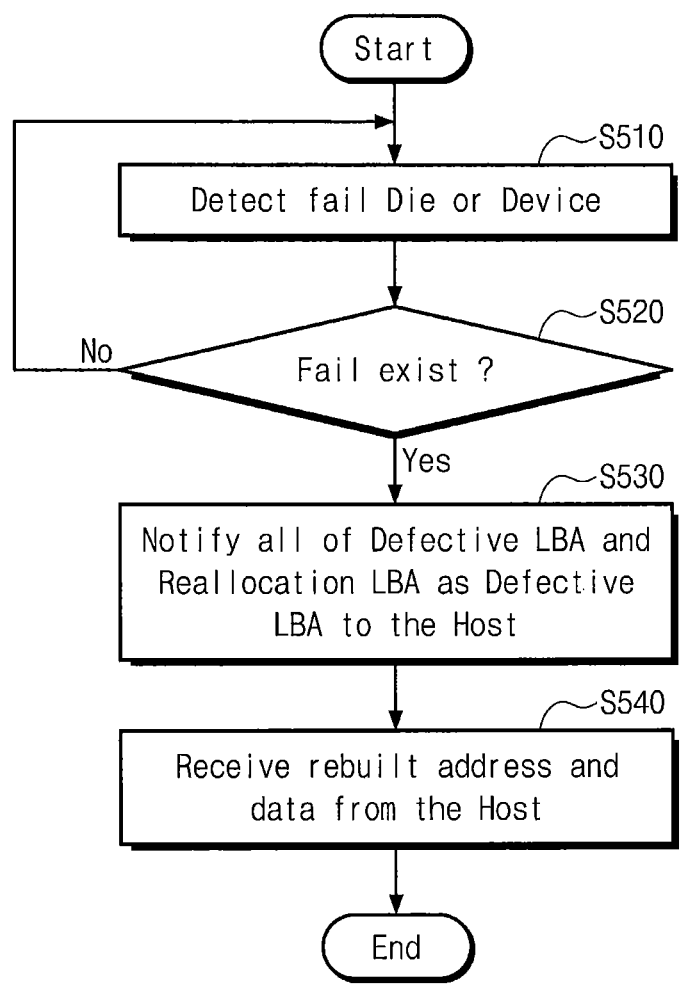
FIG. 14 is a flowchart illustrating an operation for distribution of over-provision areas of the storage device of the inventive concepts.

FIG. 14 is a flowchart illustrating an operation for distribution of over-provision areas of a storage device of the inventive concepts. Referring to FIG. 14, the storage device 400 notifies the host 300 of a defective logical address and a reallocated logical address. That is, if the storage device 400 informs the host 300 of the reallocated logical address needing data migration as the defective logical address, the host 300 may rebuild mapping to allow a decrease in an over-provision area not to be concentrated on any one sub-storage device, while performing rebuilding of the defective logical address.

In operation S510, the storage device 400 detects whether a fail is present in a plurality of sub-storage devices. A fail die, a fail device, or a fail memory area may be detected through a request of the host 300 or through an internal memory management operation of the storage device 400.

In operation S520, the storage device 400 may branch depending on whether a fail exists. If it is determined that a fail is present in at least one of the sub-storage devices (Yes), the process proceeds to operation S530. However, if it is determined that a fail is absent from the plurality of sub-storage devices (No), the process proceeds to operation S510.

In operation S530, the storage device 400 notifies the host 300 of the defective logical address and the reallocated logical address. If detective logical addresses "A" and "D" are determined, reallocated logical addresses at which data obtained by rebuilding defective data are to be stored are determined. However, in this embodiment, a reallocated logical address corresponding to a defective logical address may be notified to a host as a defective logical address. The host 300 that receives defective logical addresses "A", "B", "C", "D", and "E" may rebuild data of a memory area that is notified as a fail occurs. That is, data of a reallocated logical address not associated with a fail may also be rebuilt. Partial data may be remapped onto an over-provision area depending on a relationship defined in advance.

In operation S540, the storage device 400 may write the rebuilt data at newly adjusted logical addresses "A", "B", "C", "D", and "E" under control of the host 300.

According to an embodiment of the inventive concepts, a technology for notifying a host of both a defective logical address and a reallocated logical address as defective logical addresses without consideration of a procedure associated with separate data migration is described above. Without needing to perform a complex procedure of rebuilding data of a defective logical address and moving data to a memory area corresponding to a reallocated logical address, the host 300 may rebuild data of all logical addresses notified as defective logical addresses and may write the rebuilt data in the storage device 400.

Figure 15:
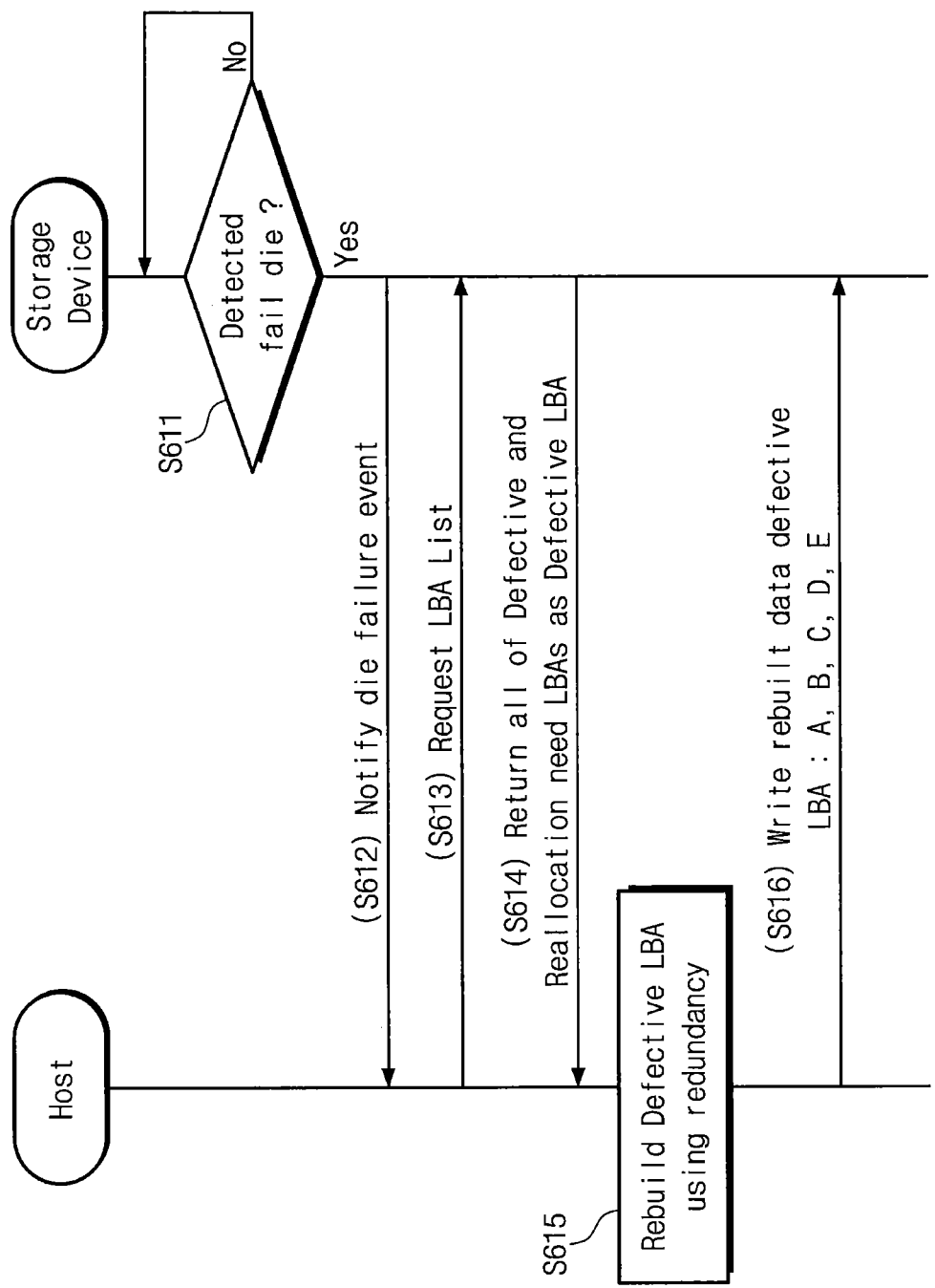
FIG. 15 is a view illustrating an interaction of the host and the storage device operating depending on the procedure of FIG. 14.

FIG. 15 is a view illustrating an interaction of a host and a storage device operating depending on the procedure of FIG. 14. Referring to FIG. 5, the host 300 is provided with a defective logical address and a reallocated logical address from the storage device 400. The storage device 400 may include a plurality of sub-storage devices SS0, SS1, SS2, and SS3.

In operation S611, the storage device 400 may detect a failure event such as occurrence of a fail die or a fail memory area. The fail may be detected upon performing an access operation of each nonvolatile memory device, such as a read operation, a write operation, or an erase operation. That is, the storage device 400 may detect a fail based on a sign of failure of the write operation, a sign of failure of the read operation, a sign of occurrence of an uncorrectable error, etc. If a fail is not detected (No), the storage device 400 may continue to detect a fail.

If it is detected that a fail die exists (Yes), in operation S612, the storage device 400 notifies the host 300 that a failure event occurs. Alternatively, the storage device 400 may notify the host 300 of occurrence of the failure event in response to a synchronous or asynchronous event request from the host 300.

In operation S613, the host 300 requests a logical address list from the storage device 400 in response to the notification of the failure event. That is, the host 300 may request the defective logical address from the storage device 400.

In operation S614, the storage device 400 transfers defective logical addresses (e.g., "A" and "D" of FIG. 10) corresponding to a fail die or a fail area to the host 300 in response to the request of the host 300. The storage device 400 may transfer the reallocated logical addresses "B", "C", and "E", at which data of the defective logical addresses "A" and "D" migrate, to the host 300 as defective logical addresses. That is, even though a fail is not actually detected, the storage device 400 notifies the host 300 of an area, at which data of the defective logical addresses "A" and "D" migrate, by using a defective logical address.

In operation S615, the host 300 may rebuild data of a list of logical addresses "A", "B", "C", "D", and "E" notified as defective logical addresses. For example, the host 300 may rebuild data corresponding to the defective logical addresses "A", "B", "C", "D", and "E" by using the RAID or a separate error correction means.

In operation S616, the host 300 may store the rebuilt data at newly mapped logical addresses "A", "B", "C", "D", and "E". In this case, an operation of repairing data to be rebuilt and a procedure of moving data of a normal memory area to an over-provision area for the purpose of storing the repaired data may be omitted. However, the reallocated logical addresses "B", "C", and "E" may be regarded as defective logical addresses, but memory areas corresponding to the reallocated logical addresses "B", "C", and "E" may be allocated as over-provision areas.

Figure 16:
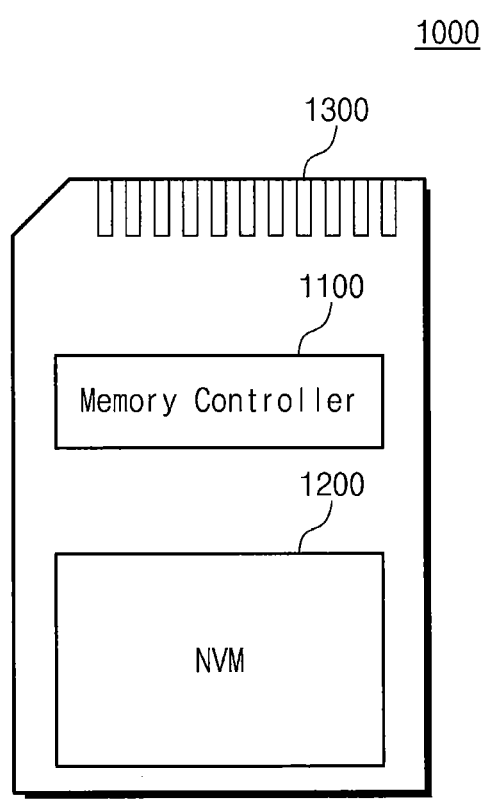
FIG. 16 is a block diagram illustrating a memory card system according to embodiments of the inventive concepts.

FIG. 16 is a block diagram illustrating a memory card system according to embodiments of the inventive concepts. Referring to FIG. 16, a memory card system 1000 includes a memory controller 1100, a nonvolatile memory 1200, and a connector 1300.

The memory controller 1100 is connected with the nonvolatile memory 1200. The memory controller 1100 is configured to access the nonvolatile memory 1200. For example, the memory controller 1200 is configured to control a read operation, a write operation, an erase operation, and a background operation of the nonvolatile memory 1200. The background operation includes operations such as a wear-leveling management operation and a garbage collection operation. In an embodiment, the memory controller 1100 may allow a decrease in an over-provision area of the nonvolatile memory 1200 including a plurality of sub-storage devices not to be concentrated on any one device.

The memory controller 1100 is configured to provide an interface between the nonvolatile memory 1200 and a host. The memory controller 1100 is configured to drive firmware for controlling the nonvolatile memory 1200. In an embodiment, the memory controller 1100 may include elements such as a random access memory (RAM), a processing unit, a host interface, a memory interface, and an error correction unit.

The memory controller 1100 may communicate with an external device through the connector 1300. The memory controller 1100 may communicate with an external device (e.g., a host) in compliance with a specific communication protocol. For example, the memory controller 1100 may communicate with the external device through at least one of various communication protocols such as, but not limited to, universal serial bus (USB), multimedia card (MMC), eMMC (embedded MMC), peripheral component interconnection (PCI), PCI-express (PCI-E), advanced technology attachment (ATA), a serial-ATA, parallel-ATA, small computer small interface (SCSI), enhanced small disk interface (ESDI), integrated drive electronics (IDE), Firewire, universal flash storage (UFS), and nonvolatile memory express (NVMe). In an embodiment, a write command defined by the above-described standards may include size information of write data.

The nonvolatile memory 1200 may be implemented with a variety of nonvolatile memory devices, such as, but not limited to, an electrically erasable and programmable ROM (EEPROM), a NAND flash memory, a NOR flash memory, a phase-change RAM (PRAM), a resistive RAM (ReRAM), a ferroelectric RAM (FRAM), and a spin-torque magnetic RAM (STT-MRAM).

In an embodiment, the memory controller 1100 and the nonvolatile memory 1200 may be integrated in a single semiconductor device. The memory controller 1100 and the nonvolatile memory 1200 may be integrated in a single semiconductor device to form a solid state drive (SSD). The memory controller 1100 and the nonvolatile memory 1200 may be integrated in a single semiconductor device to constitute a memory card. For example, the memory controller 1100 and the nonvolatile memory 1200 may be integrated in a single semiconductor device to form a memory card such as a PC card (a personal computer memory card international association (PCMCIA) card), a compact flash card (CF), a smart media card (SM, SMC), a memory stick, a multimedia card (MMC, RS-MMC, MMC-micro, eMMC), an SD card (SD, miniSD, microSD, SDHC), and a universal flash storage (UFS).

Figure 17:
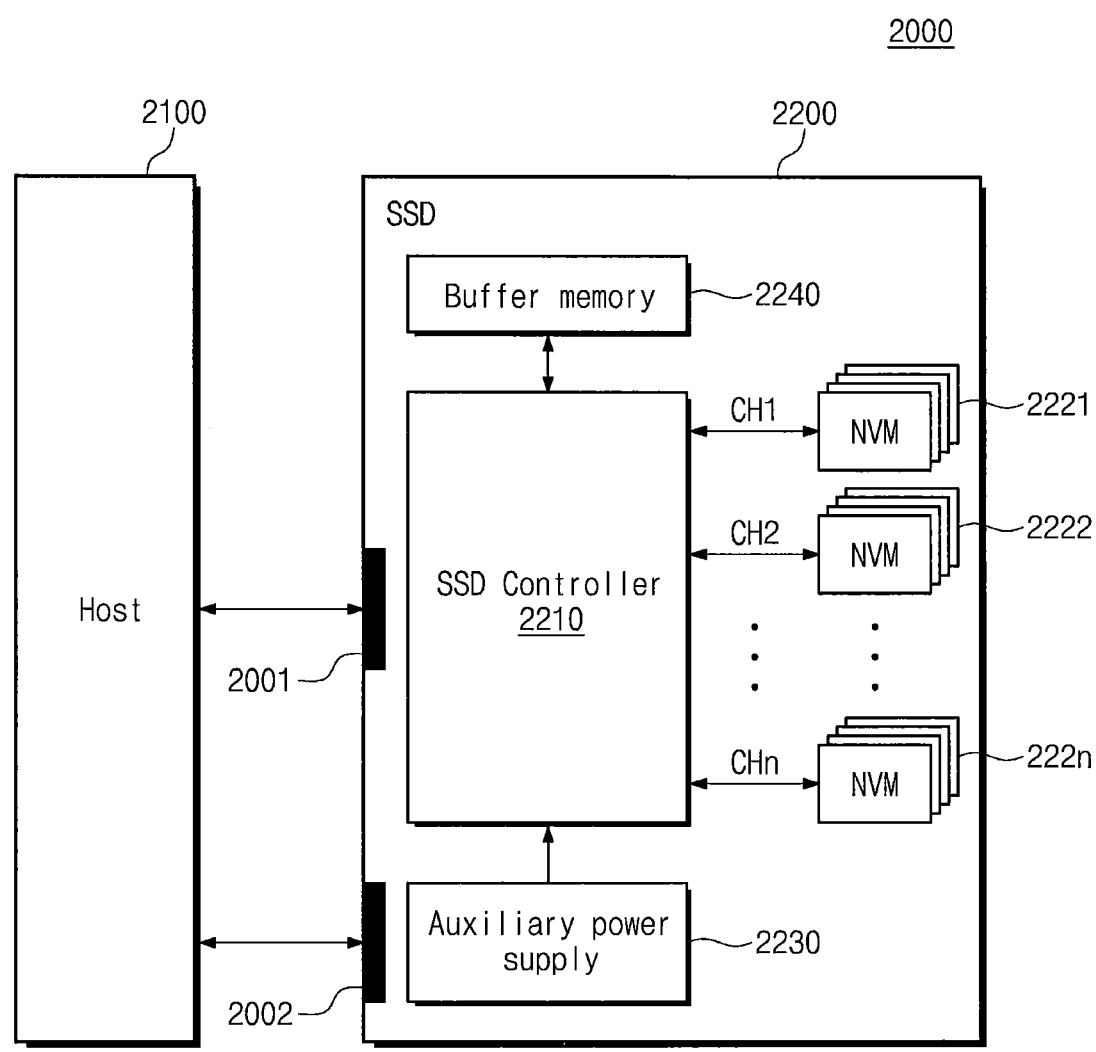
FIG. 17 is a block diagram illustrating a solid state drive including a nonvolatile memory system according to the inventive concepts.

FIG. 17 is a block diagram illustrating a solid state drive (SSD) including a nonvolatile memory system according to the inventive concepts. Referring to FIG. 17, an SSD system 2000 includes a host 2100 and an SSD 2200. The SSD 2200 exchanges signals SIG with the host 2100 through a signal connector 2001 and is supplied with power through a power connector 2002. The SSD 2200 includes an SSD controller 2210, a plurality of flash memories 2221 to 222$n$, an auxiliary power supply 2230, and a buffer memory 2240.

The SSD controller 2210 may control the flash memories 2221 to 222$n$ in response to the signals SIG from the host 2100. In an embodiment, the SSD controller 2210 may operate based on the method described with reference to FIGS. 1 to 15. The SSD controller 2210 may allow a decrease in an over-provision area of the flash memories 2221 to 222$n$ constituting a plurality of sub-storage devices not to be concentrated on any one device.

The auxiliary power supply 2230 is connected with the host 2100 via the power connector 2002. The auxiliary power supply 2230 may be charged by the power from the host 2100. When power is not smoothly supplied from the host 2100, the auxiliary power supply 2230 may power the SSD system 2000. The auxiliary power supply 2230 may be placed inside or outside the SSD 2200. For example, the auxiliary power supply 2230 may be placed in a main board to supply auxiliary power to the SSD 2200.

The buffer memory 2240 operates as a buffer memory of the SSD 2200. For example, the buffer memory 2240 may temporarily store data received from the host 2100 or from the flash memories 2221 to 222$n$ or may temporarily store metadata (e.g., a mapping table) of the flash memories 2221 to 222$n$. The buffer memory 2240 may include a volatile memory such as a dynamic RAM (DRAM), a synchronous DRAM (SDRAM), a double date rate (DDR) SDRAM, a low power double data rate (LPDDR) SDRAM, or a static RAM (SRAM) or a nonvolatile memory such as a ferroelectric RAM (FRAM), a resistive RAM (ReRAM), a spin transfer torque-magnetoresistive RAM (STT-MRAM), and a phase change RAM (PRAM).

Figure 18:
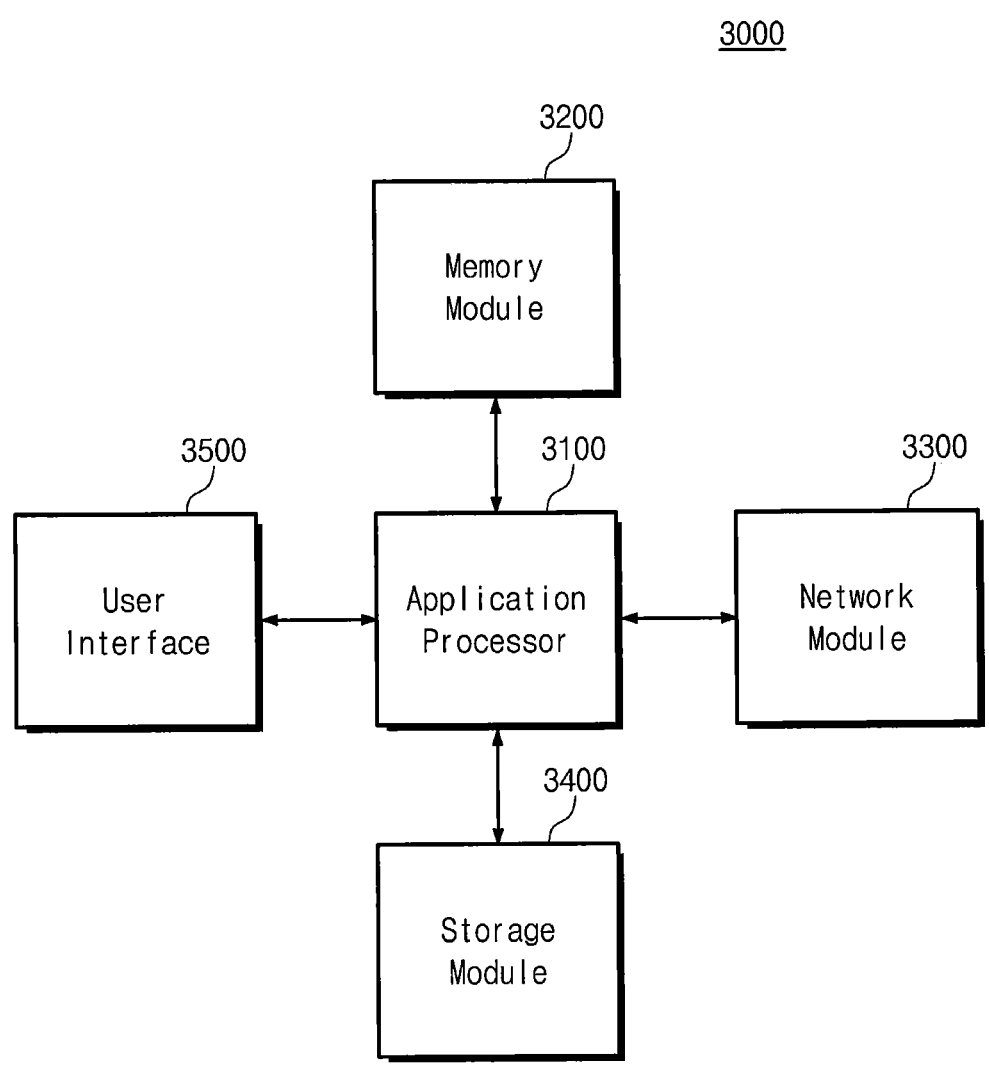
FIG. 18 is a block diagram illustrating a user system using the storage device according to the inventive concepts.

FIG. 18 is a block diagram illustrating a user system using a storage device according to the inventive concepts. Referring to FIG. 18, a user system 3000 includes an application processor 3100, a memory module 3200, a network module 3300, a storage module 3400, and a user interface 3500.

The application processor 3100 may drive elements, an operating system, etc. of the user system 3000. In an embodiment, the application processor 3100 may include controllers for controlling elements of the user system 3000, graphics engines, a variety of interfaces, etc. The application processor 3100 may be a system-on-chip (SoC).

The memory module 3200 may operate as a main memory, a working memory, a buffer memory, or a cache memory of the user system 3000. The memory module 3200 may be implemented with a volatile random access memory, such as a DRAM, an SDRAM, a double date rate DRAM (DDR SDRAM), a DDR2 SDRAM, a DDR3 SDRAM, an LPDDR DRAM, an LPDDR2 DRAM, or an LPDDR3 DRAM or a nonvolatile random access memory, such as a PRAM, an MRAM, a RRAM, or a FRAM.

The network module 3300 may communicate with external devices. In an embodiment, the network module 3300 may support wireless communications, such as code division multiple access (CDMA), global system for mobile communication (GSM), wideband CDMA (WCDMA), CDMA-2000, time division multiple access (TDMA), long term evolution (LTE), Wimax, WLAN, UWB, Bluetooth, and WI-DI. In an embodiment, the network module 3300 may be included in the application processor 3100.

The storage module 3400 may store data. For example, the storage module 3400 may store data received from the application processor 3100. Alternatively, the storage module 3400 may provide the application processor 3100 with data stored in the storage module 3400. For example, the storage module 3400 may be implemented with a nonvolatile semiconductor memory device such as a PRAM, an MRAM, a RRAM, a NAND flash memory, a NOR flash memory, or a three-dimensional NAND flash memory. In an embodiment, the storage module 3400 may operate depending on the manner described with reference to FIGS. 1 to 15.

The user interface 3500 may include interfaces that input data or a command to the application processor 3100 or output data to an external device. For example, the user interface 3500 may include user input interfaces such as a keyboard, a keypad, buttons, a touch panel, a touch screen, a touch pad, a touch ball, a camera, a microphone, a gyroscope sensor, a vibration sensor, and a piezoelectric sensor. The user interface 3500 may further include user output interfaces such as a liquid crystal display (LCD), an organic light-emitting diode (OLED) display device, an active matrix OLED (AMOLED) display device, a light-emitting diode (LED), a speaker, and a motor.

According to an embodiment of the inventive concepts, it may be possible to provide a storage device capable of minimizing performance degradation even though a fail occurs in some flash memory devices. In particular, it may be possible to implement a solid state drive capable of effectively distributing a workload concentrated on a sub-storage device, in which a fail occurs, to any other normal sub-storage devices.

While the inventive concepts have been described with reference to embodiments, it will be apparent to those skilled in the art that various changes and modifications may be made without departing from the spirit and scope of the inventive concepts. Therefore, it should be understood that the above embodiments are not limiting, but illustrative.

What is claimed is:

1. An operation method of a storage device which includes a plurality of sub-storage devices, each of the sub-storage devices including an over-provision area respectively, the method comprising:
   detecting whether to redistribute an available capacity of the over-provision area in at least one of the plurality of sub-storage devices;
   notifying a host of a logical address mapped onto a failed area of a first memory area as a defective logical address, and notifying the host of a reallocated logical address mapped onto a second memory area selected to replace the first memory area; and
   writing data from the first memory area rebuilt by the host in the second memory area and distributing and storing data present in the second memory area in at least two different over-provision areas of the plurality of sub-storage devices.

2. The method of claim 1, wherein the first memory area and the second memory area belong to a sub-storage device that includes the failed area.

3. The method of claim 1, wherein the host rebuilds the data of the first memory area through an error correction operation or a RAID repair operation.

4. The method of claim 1, wherein, detecting whether to redistribute the available capacity of the over-provision area includes detecting whether at least one failed nonvolatile memory device is present in nonvolatile memory devices included in the plurality of sub-storage devices.

5. The method of claim 1, wherein the reallocated logical address is selected within a logical address range of a user area of a sub-storage device onto which the defective logical address is mapped.

6. The method of claim 1, further comprising:
   notifying, at the storage device, the host of an occurrence of a failure event depending on the detection result.

7. The method of claim 1, wherein the data present in the second memory area are distributed and stored in the at least two different over-provision areas of the plurality of sub-storage devices before the rebuilt data of the first memory area are written in the second memory area.

8. The method of claim 1, wherein the distributing and storing is performed in response to a specific command provided from the host.

9. An operation method of a storage device which includes a plurality of sub-storage devices respectively including over-provision areas, the method comprising:
   detecting a failed memory area present in a first sub-storage device of the plurality of sub-storage devices;
   notifying a host of a first logical address of the first sub-storage device corresponding to the failed memory area and a second logical address of the first sub-storage device corresponding to a reallocated logical address comprising data migrated from the failed memory area, depending on the detection result; and
   storing data from the first logical address and the second logical address that has been rebuilt by the host in the plurality of sub-storage devices,
   wherein a part of the rebuilt data is stored in the over-provision area of a second sub-storage device of the plurality of sub-storage devices that is different from the first sub-storage device.

10. The method of claim 9, further comprising:
    rebuilding, at the host, data mapped onto the first logical address and the second logical address,
    wherein the host rebuilds the data mapped onto the first logical address and the second logical address through an error correction operation or a RAID repair operation.

11. The method of claim 9, wherein the host controls the storage device such that a part of the rebuilt data is stored in the over-provision areas of a third sub-storage device of the plurality of sub-storage devices.

12. The method of claim 11, wherein the host controls the storage device such that the rebuilt data is stored in an over-provision area of each sub-storage device of the plurality of sub-storage devices except for the first sub-storage device in which the failed memory area is present.

13. The method of claim 9, wherein the first logical address and the second logical address are mapped onto a user area of the first sub-storage device.

14. An operation method of a storage device which includes a plurality of sub-storage devices respectively including over-provision areas, the method comprising:
    determining that a failed memory area is present in at least one of the plurality of sub-storage devices;
    notifying a host of a first logical address corresponding to the failed memory area;
    notifying the host of a second logical address corresponding to an allocated memory area selected to replace the failed memory area, wherein a first portion of the allocated memory area is in the over-provision area of a first sub-storage device of the plurality of sub-storage devices, and wherein a second portion of the allocated memory area is in the over-provision area of a second sub-storage device of the plurality of sub-storage devices; and storing rebuilt data in the allocated memory area, wherein a first part of the data is stored in the first portion of the allocated memory area and wherein a second part of the data is stored in the second portion of the allocated memory area.

15. The method of claim 14, wherein the failed memory area is present in one of the first sub-storage device and the second sub-storage device.

16. The method of claim 14, wherein the sub-storage devices of the plurality of sub-storage devices are nonvolatile memory devices.

17. The method of claim 14, wherein the failed memory area is present in a sub-storage device other than the first sub-storage device and the second sub-storage device.

18. The method of claim 14, wherein an amount of data in the first part of the data is approximately equal to an amount of data in the second part of the data.

19. The method of claim 14, wherein the rebuilt data corresponds to data stored in the failed memory area.

20. The method of claim 19, wherein the rebuilt data is received from the host.

* * * * *